(12) United States Patent
Sugiyama et al.

(10) Patent No.: US 10,883,302 B2
(45) Date of Patent: Jan. 5, 2021

(54) OPENING-CLOSING-BODY DRIVE MOTOR AND OPENING-CLOSING-BODY DRIVE SYSTEM

(71) Applicant: DENSO CORPORATION, Kariya (JP)

(72) Inventors: Shigeru Sugiyama, Kariya (JP); Yutaka Naito, Kariya (JP); Ritsurou Hiramatsu, Kariya (JP); Teruyuki Toyoda, Kariya (JP); Motoya Yamamoto, Kariya (JP); Nobuo Mizutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 271 days.

(21) Appl. No.: 16/073,090

(22) PCT Filed: Mar. 16, 2017

(86) PCT No.: PCT/JP2017/010724
§ 371 (c)(1),
(2) Date: Jul. 26, 2018

(87) PCT Pub. No.: WO2017/159802
PCT Pub. Date: Sep. 21, 2017

(65) Prior Publication Data
US 2019/0003238 A1    Jan. 3, 2019

(30) Foreign Application Priority Data

Mar. 16, 2016 (JP) .................................. 2016-052915
Mar. 16, 2016 (JP) .................................. 2016-052916
(Continued)

(51) Int. Cl.
*E05F 15/697* (2015.01)
*E05F 15/70* (2015.01)
(Continued)

(52) U.S. Cl.
CPC ............... *E05F 15/697* (2015.01); *B60J 1/17* (2013.01); *B60Q 9/00* (2013.01); *E05F 15/70* (2015.01);
(Continued)

(58) Field of Classification Search
CPC ............. H02P 7/05; H02P 7/29; E05F 15/697
(Continued)

(56) References Cited

U.S. PATENT DOCUMENTS 6,469,464 B1 * 10/2002 McCall ................. E05F 15/668
318/245
6,936,983 B2 * 8/2005 Kachouh ................. E05B 81/06
292/201
(Continued)

FOREIGN PATENT DOCUMENTS

JP    S63-170318 U    11/1988
JP    H10-66346 A    3/1998
(Continued)

OTHER PUBLICATIONS

Jun. 20, 2017 International Search Report issued in International Patent Application No. PCT/JP2017/010724.
(Continued)

*Primary Examiner* — David Luo
(74) *Attorney, Agent, or Firm* — Oliff PLC

(57) ABSTRACT

An opening-closing body driving motor includes a motor body, a drive circuit, and a control circuit. The motor body is provided to automatically open and close an opening-closing body of a vehicle. The drive circuit supplies driving power to the motor body. The control circuit includes a PWM controller. The control circuit is configured to adjust the driving power by PWM control and control an operation mode of the opening-closing body through the motor body such that the operation mode is changeable. The PWM
(Continued)

controller is configured to have a control frequency of the PWM control include a frequency in an audible range based on a predetermined trigger so that the motor body vibrates in the audible range, thereby performing a sound producing operation. The predetermined trigger includes information about an opening-closing state of the opening-closing body or information about activation and deactivation of a child lock.

22 Claims, 12 Drawing Sheets

(30) Foreign Application Priority Data

| Mar. 16, 2016 | (JP) | 2016-052917 |
|---|---|---|
| Apr. 20, 2016 | (JP) | 2016-084442 |
| Feb. 21, 2017 | (JP) | 2017-030355 |
| Feb. 21, 2017 | (JP) | 2017-030356 |
| Feb. 21, 2017 | (JP) | 2017-030357 |

(51) Int. Cl.
*B60J 1/17* (2006.01)
*H02P 7/03* (2016.01)
*H02P 7/29* (2016.01)
*B60Q 9/00* (2006.01)

(52) U.S. Cl.
CPC ............... *H02P 7/05* (2016.02); *H02P 7/29* (2013.01); *E05Y 2900/55* (2013.01)

(58) Field of Classification Search
USPC .................................................. 318/599, 560
See application file for complete search history.

(56) References Cited

U.S. PATENT DOCUMENTS

| 7,609,017 | B2* | 10/2009 | Sugimoto | E05F 15/697 |
|---|---|---|---|---|
| | | | | 318/280 |
| 8,049,445 | B2* | 11/2011 | Ishihara | H02P 7/285 |
| | | | | 318/400.01 |
| 2014/0297133 | A1* | 10/2014 | Oikawa | B60N 2/26 |
| | | | | 701/45 |

FOREIGN PATENT DOCUMENTS

| JP | 2003-102187 A | 4/2003 |
|---|---|---|
| JP | 2005-336831 A | 12/2005 |
| JP | 2014-190124 A | 10/2014 |

OTHER PUBLICATIONS

Sep. 18, 2018 International Preliminary Report on Patentability issued in International Patent Application No. PCT/JP2017/010724.

* cited by examiner

<Child Lock Deactivated>

<Child Lock Activated>

OPENING-CLOSING-BODY DRIVE MOTOR AND OPENING-CLOSING-BODY DRIVE SYSTEM

TECHNICAL FIELD

The present invention relates to an opening-closing body driving motor and an opening-closing body driving system for automatically opening and closing a power window, a sliding roof, a sliding door, etc.

BACKGROUND ART

In a power window system as an opening-closing body driving system of a vehicle, in a situation in which all or a specific occupant including a driver gets out of and leaves the vehicle, it is preferred that a window glass be in a fully closed state from a viewpoint of crime prevention. For this reason, there is a vehicle having a function of giving a warning by a speaker, a display, etc. when the window glass is not in the fully closed state in a situation in which all or a specific occupant gets out of the vehicle (for example, see Patent Document 1).

PRIOR ART DOCUMENT

Patent Document
Patent Document 1: Japanese Laid-Open Patent Publication No. 2005-336831

SUMMARY OF THE INVENTION

Problems that are to be Solved by the Invention

Meanwhile, many vehicles are equipped with a power window system that automatically opens and closes a window glass by driving a power window motor. In this regard, the inventor has been considering notifying an occupant, etc. in a vehicle state in which the occupant gets out of a vehicle and it is preferable to fully close a window glass that is in an open state. In addition, the inventor has been considering notifying an occupant, etc. of a predetermined opening and closing operation of a window glass by driving of a power window motor. In addition, the inventor has been considering notifying an occupant, etc. of an opening and closing operation of a window glass by driving of a power window motor under a predetermined situation such as when, for example, a child gets in a vehicle. With regard to this notification, the inventor has been considering whether something can be done with the power window motor directly involved in the opening and closing operation of the window glass. In addition, in this case, it is necessary to devise a scheme that minimizes effects on driving of the motor. Further, in addition to such a power window system, the above description is applied to a system for automatically opening and closing a sliding roof and a sliding door.

An object of the invention is to provide an opening-closing body driving motor and an opening-closing body driving system in which an opening-closing body performs a sound producing operation.

Means for Solving the Problem

To achieve the above object, one aspect of the present invention is an opening-closing body driving motor that includes a motor body, a drive circuit, and a control circuit. The motor body is provided to automatically open and close an opening-closing body of a vehicle. The drive circuit supplies driving power to the motor body. The control circuit includes a PWM controller. The control circuit is configured to adjust the driving power by PWM control and control an operation mode of the opening-closing body through the motor body such that the operation mode is changeable. The PWM controller is configured to have a control frequency of the PWM control include a frequency in an audible range based on a predetermined trigger so that the motor body vibrates in the audible range, thereby performing a sound producing operation. The predetermined trigger includes information about an opening-closing state of the opening-closing body or information about activation and deactivation of a child lock.

EMBODIMENTS OF THE INVENTION

First Embodiment

Hereinafter, a description will be given of a first embodiment of a power window system as an opening-closing body driving system.

Figure 1:
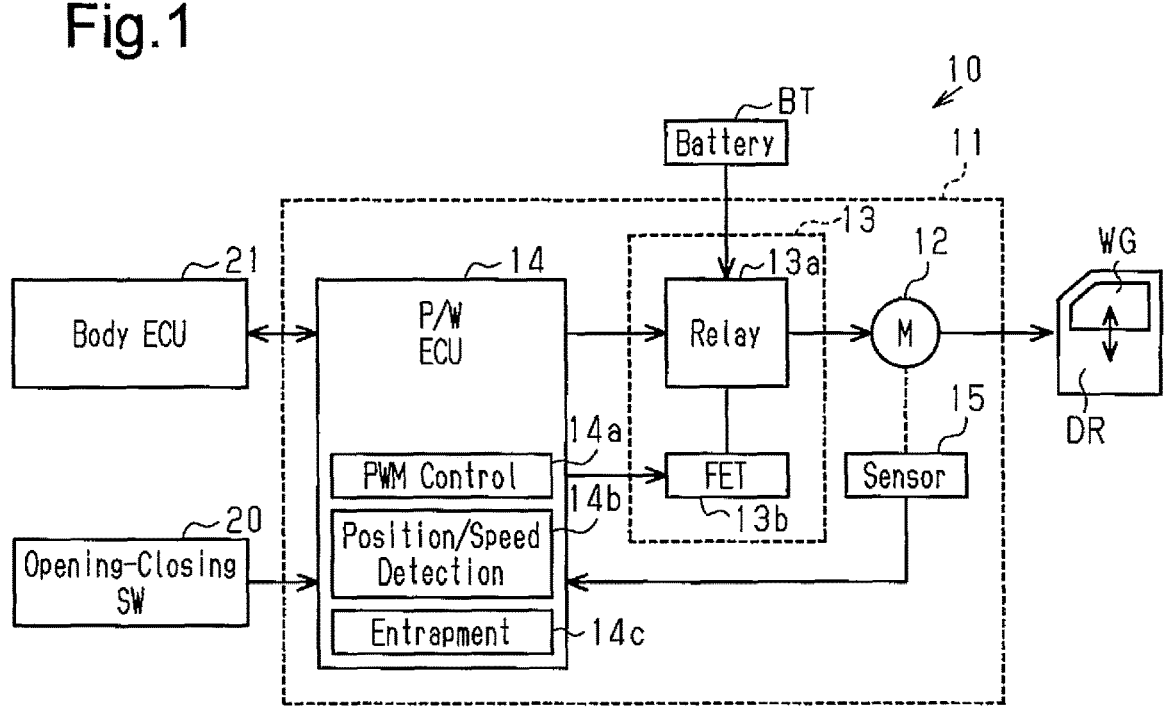
FIG. 1 is a schematic configuration diagram of a system including a power window motor in a first embodiment.

As illustrated in FIG. 1, a power window system 10 mounted in a vehicle includes a power window motor 11 as an opening-closing body driving motor mounted in each door DR to automatically open and close a window glass WG of a vehicle door DR and a body electric control unit (ECU) 21 connected to the power window motor 11 of each door DR such that communication is allowed.

The power window motor 11 is configured by integrally coupling a motor body 12, a drive circuit 13, and a power window ECU (P/W ECU) 14 as a control circuit.

A control circuit (circuitry) can be realized by one or more dedicated hardware circuits such as an application specific integrated circuit (ASIC), one or more processing circuits operating in accordance with a computer program (software), or a combination thereof. The processing circuit has a central processing unit (CPU) and a memory (read only memory (ROM), random access memory (RAM), etc.) storing a program executed by the CPU. The memory, that is, a computer-readable medium, includes all types of available media that can be accessed by a general-purpose or dedicated computer.

The motor body 12 is driven to rotate based on the supply of driving power from the drive circuit 13, and opens and closes the window glass WG in a vertical direction via a window regulator (not illustrated).

The drive circuit 13 includes a relay circuit 13a and a field effect transistor (FET) 13b as a switching element. The relay circuit 13a is a circuit that receives power supplied from a battery BT mounted in the vehicle and supplies and stops driving power for forward and reverse driving with respect to the motor body 12. In addition, the FET 13b, which serves as a semiconductor switching element, undergoes pulse width modulation (PWM) control and adjusts driving power that is output from the relay circuit 13a. In more detail, the relay circuit 13a performs forward or reverse rotation driving of the motor body 12 and stops the driving thereof, that is, performs an operation in an opening or closing direction of the window glass WG and stops the operation. The FET 13b changes a rotation speed of the motor body 12, that is, changes an operating speed of the window glass WG. The relay circuit 13a and the FET 13b are controlled by the P/W ECU 14.

The P/W ECU 14 includes a PWM controller 14a, a position/speed detector 14b, and an entrapment processor 14c. The P/W ECU 14 performs various control operations related to an opening-closing operation of the window glass WG using the PWM controller 14a, the position/speed detector 14b, the entrapment processor 14c, etc. When various control operations are performed, a rotation pulse signal synchronized with rotation of the motor body 12 is input to the P/W ECU 14 from a rotation sensor 15. In addition, an opening or closing command signal from an opening-closing switch 20 included in, for example, the vehicle door DR is input to the P/W ECU 14.

The P/W ECU 14 switches the relay circuit 13a to a power feedable state (ON) in a feeding direction for rotating the motor body 12, for example, in a forward direction in the case of input of an opening command signal and in a feeding direction for rotating the motor body 12, for example, in a reverse direction in the case of input of a closing command signal. In addition, in this case, the PWM controller 14a of the P/W ECU 14 sends a PWM control signal to a control terminal of the FET 13b to switch the FET 13b so that the FET 13b is kept in an ON state (duty 100%) or switched on and off (duty variable) at a predetermined frequency. When there is no input of the opening-closing command signal, the P/W ECU 14 suspends (OFF) the supply of power to the motor body 12 with respect to the relay circuit 13a, and the PWM controller 14a turns off the FET 13b through a PWM control signal.

The position/speed detector 14b detects a rotational position of the motor body 12, that is, a position of the window glass WG, based on the rotation pulse signal synchronized with rotation of the motor body 12, more specifically, edge count of a pulse signal. Position information of the window glass WG is stored in a memory (not illustrated) in the P/W ECU 14 each time. In addition, the position/speed detector 14b detects a rotation speed of the motor body 12 (operating speed of the window glass WG) similarly based on the rotation pulse signal, more specifically, based on a length of a cycle of a pulse signal. As the rotation speed of the motor body 12 decreases, the cycle of the rotation pulse signal lengthens.

When the rotation speed of the motor body 12 in operation of closing the window glass WG decreases to a reference speed or below, the entrapment processor 14c determines that an object is entrapped between the vehicle door DR and the window glass WG in a closing operation. In this case, when the operating speed of the window glass WG is changed during the operation in accordance with, for example, the position of the window glass WG, the reference speed for determining entrapment is also changed, accordingly. When it is determined that entrapment has occurred, the entrapment processor 14c controls the relay circuit 13a and the FET 13b to open the window glass WG, for example, by a predetermined amount so that the entrapped object can be released. The entrapment processor 14c may determine trapping of an object between the vehicle door DR and the window glass WG in an opening operation. In this case, the entrapment processor 14c controls the relay circuit 13a and the FET 13b to close the window glass WG, for example, by a predetermined amount so that the trapped object can be released.

The P/W ECU 14 is connected to the body ECU 21 corresponding to a host ECU such that communication is allowed through a vehicle communication system. Examples of the vehicle communication system include local interconnect network (LIN) communication, controller area network (CAN) communication, etc. The P/W ECU 14 acquires various kinds of vehicle information, for example, getting-out information indicating that an occupant gets out of the vehicle, from the body ECU 21.

Next, a description will be given of an operation (action) of the power window system 10. Hereinafter, a window glass WG of a door DR on a driver seat side and the power window motor 11 will be described as a representative. In addition, a description will be given of a case in which the window glass WG is not in a fully closed state (within a fully closed region) when all or a specific occupant including the driver gets out of the vehicle.

Figure 2:
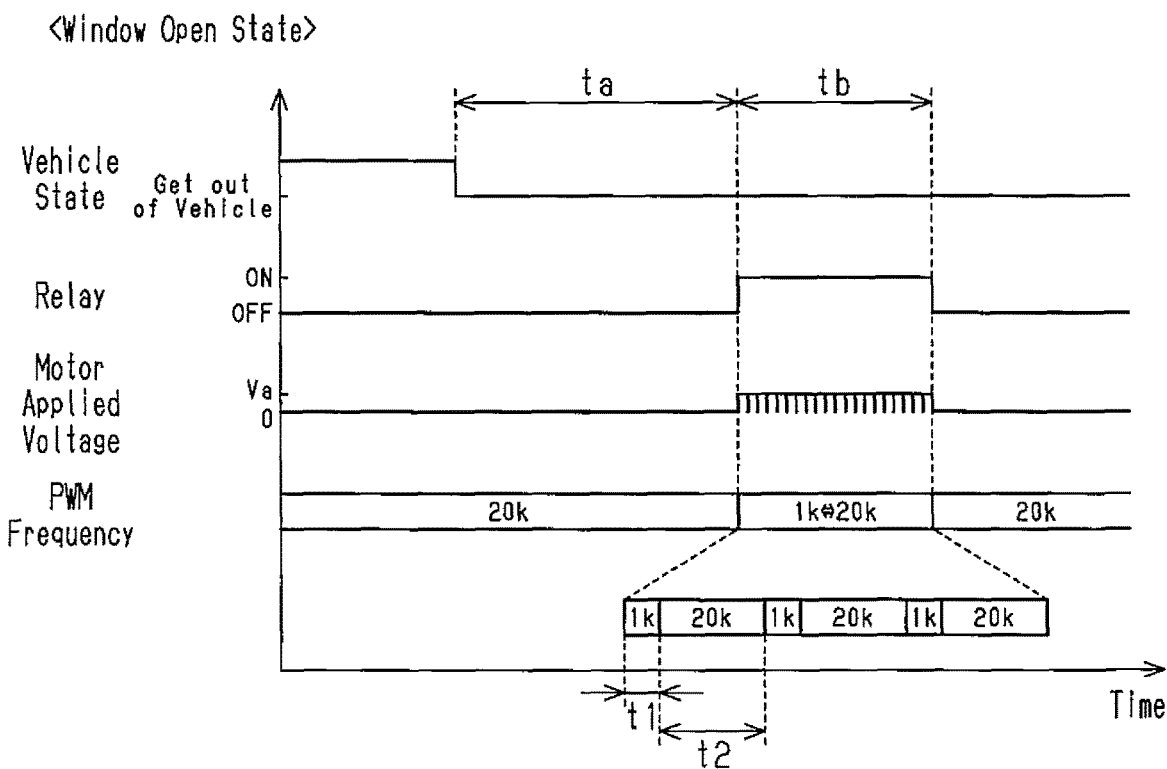
FIG. 2 is an explanatory diagram for description of an operation in the first embodiment.

When all or a specific occupant gets out of the vehicle, the body ECU 21 obtains the getting-out information. As illustrated in FIG. 2, the P/W ECU 14 recognizes the getting-out information from the body ECU 21. When the window glass WG is fully closed at the time of recognizing the getting-out information, the P/W ECU 14 maintains a normal mode for performing a normal opening-closing operation.

In a case in which the window glass WG is not in the fully closed state (written as window open state in FIG. 2), the P/W ECU 14 recognizes that the vehicle is in a state in which it is preferred that the window glass WG in the open state be switched to the fully closed state, that is, a sound production request for reporting an intention thereof occurs, considering the getting-out information. The P/W ECU 14 shifts from the normal mode to a sound production mode.

After a predetermined standby period to (for example, one second) lapses from shifting to the sound production mode, the P/W ECU 14 operates the relay circuit 13*a* and the FET 13*b* of the drive circuit 13 to perform the sound producing operation. For example, an operation period tb of the relay circuit 13*a* and the FET 13*b* is 0.6 seconds.

The voltage of the battery BT, that is, a voltage (motor applied voltage) applied to the motor body 12 through the drive circuit 13 is about 12 V at a normal time (duty 100%). In the operation period tb, the PWM controller 14*a* turns on and off the FET 13*b* with a small duty so that the motor applied voltage becomes 3 V or less, preferably 1 V or less, or a minute voltage Va of about 0.5 V in the present embodiment. In this case, in the motor body 12, extremely minute vibration occurs within a range in which counts by the rotation pulse signal are less than the minimum number of counts. This minute vibration is absorbed by static friction, a wobble, etc. on a drive path to the window glass WG, and does not operate the window glass WG (within an inoperative range of the window glass WG).

In addition, a normal control frequency used by the PWM controller 14*a* is about 20 kHz. In the operation period tb, the PWM controller 14*a* switches the control frequency from 1 kHz→20 kHz→1 kHz→20 kHz→1 kHz→20 kHz. When the operation period tb is, for example, 0.6 seconds, a period t1 corresponding to 1 kHz is, for example, 50 milliseconds, and a period t2 corresponding to 20 kHz is, for example, 150 milliseconds. Thus, the vibration of the motor body 12 corresponds to a frequency corresponding to 1 kHz in the period t1 of 1 kHz and a frequency corresponding to 20 kHz in the period t2 of 20 kHz.

In other words, minute vibration of the motor body 12 becomes a sound within a human audible range in the period t1, in which the control frequency is 1 kHz. In the period t2 corresponding to 20 kHz, minute vibration of the motor body 12 is in an inaudible range and thus cannot be heard as a sound by a human being. Within the operation period tb, switching of the control frequency from 1 kHz to 20 kHz is repeated three times, and thus a sound is produced in each period t1, which corresponds to 1 kHz.

As described above, in the power window system 10 (the power window motor 11) of the present embodiment, after the standby period to lapses from shifting to the sound production mode, in the operation period tb, a sound is produced three times based on the vibration of the motor body 12, and the sound functions as a warning sound indicating that the window glass WG is not in the fully closed state. Thus, for example, the occupant who gets out of the vehicle last may recognize that the window glass WG is not in the fully closed state, which may lead to a subsequent action such as closing the window glass WG to the fully closed state.

Next, advantageous effects of the first embodiment will be described.

(1) In response to shifting to the sound production mode, the motor applied voltage to the motor body 12 is switched to the minute voltage Va such that the motor body 12 minutely vibrates within the inoperative range of the window glass WG in accordance with the adjustment of PWM control, and the control frequency in PWM control is changed from the inaudible range (for example, 20 kHz) to the audible range (for example, 1 kHz). Consequently, the motor body 12 minutely vibrates within the audible range and produces the sound without operating the window glass WG. In a case of a vehicle state in which all or a specific occupant gets out of the vehicle and the fully closed state is preferable, the sound produced by the motor body 12 may notify the occupant getting out of the vehicle, etc. that the window glass WG is not in the fully closed state.

(2) After the predetermined standby period to (for example, one second) lapses from shifting to the sound production mode, the motor body 12 performs the sound producing operation. Thus, if a sound production request includes a getting-out condition, overlapping with a sound related to getting out of the vehicle (closing sound of the door DR, etc.) is avoided. For this reason, the sound produced by the motor body 12 may be easily heard.

(3) Since sound production by the motor body 12 is repeated two times or more, preferably three times, at the time of the sound producing operation, the sound produced by the motor body 12 may be easily noticed.

Second Embodiment

Hereinafter, a description will be given of a second embodiment of a power window system as an opening-closing body driving system.

Figure 3:
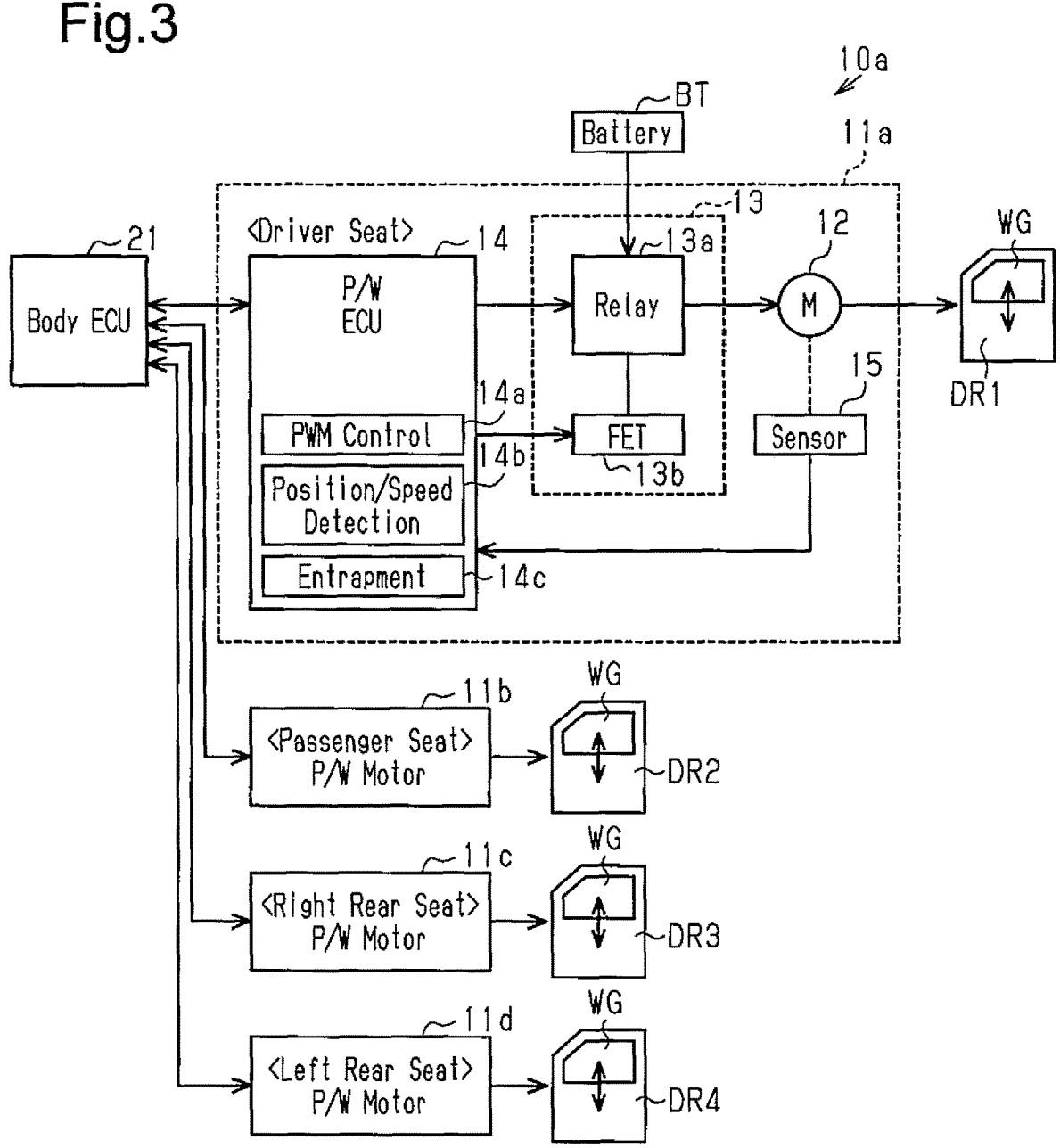
FIG. 3 is a schematic configuration diagram of a system including a power window motor in a second embodiment.

As illustrated in FIG. 3, a power window system 10*a* of the present embodiment is a system for a vehicle having four doors DR1 to DR4. The power window system 10*a* includes a power window motor 11*a* for automatically opening and closing a window glass WG of a driver seat door DR1, a power window motor 11*b* for automatically opening and closing a window glass WG of a passenger seat door DR2, a power window motor 11*c* for automatically opening and closing a window glass WG of a right rear seat door DR3, and a power window motor 11*d* for automatically opening and closing a window glass WG of a left rear seat door DR4. The motors 11*a* to 11*d* are connected to a body ECU 21 by LIN communication, etc. such that communication is allowed, and synchronized with each other.

FIG. 3 representatively illustrates a specific configuration of the power window motor 11*a*, and each of the motors 11*a* to 11*d* has the same configuration as that of the power window motor 11 of the first embodiment. For this reason, a detailed description will be omitted. In addition, in FIG. 3, an opening-closing switch 20 of each of the motors 11*a* to 11*d* is omitted to prevent complexity of the drawing.

Next, a description will be given of an operation (action) of the power window system 10*a*.

Figure 4:
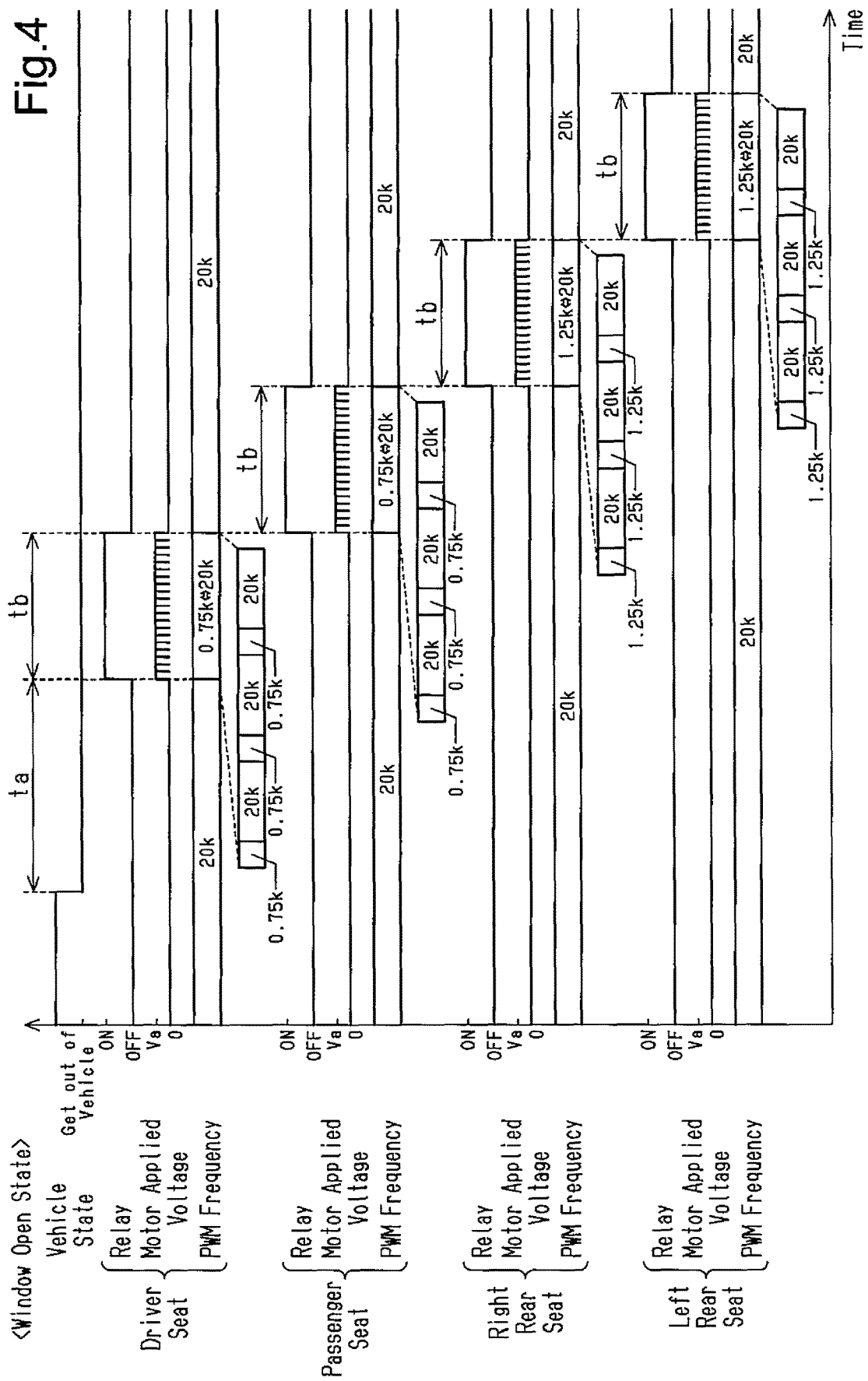
FIG. 4 is an explanatory diagram for description of an operation in the second embodiment.

As illustrated in FIG. 4, when a window glass WG is not in a fully closed state (written as window open state in FIG. 4) at the time of receiving getting-out information indicating that all or a specific occupant gets out of the vehicle, ones of the P/W ECUs 14 of the motors 11*a* to 11*d* that correspond to the window glass WG not in the fully closed state shift to a sound production mode.

When shifting to the sound production mode, the ones of the P/W ECUs 14 of the motors 11*a* to 11*d* shifting to the mode wait for a lapse of a predetermined standby period ta (for example, one second). After the lapse of the standby period ta, a sound producing operation of an operation period tb (for example, 0.6 seconds) is performed for each of the driver seat, the passenger seat, the right rear seat, and the left rear seat so that the sound production timing is shifted for each position to avoid overlap.

More specifically, immediately after the lapse of the standby period ta, the sound producing operation of the operation period tb by the motor 11*a* (motor body 12) of the driver seat is set. Then, after the lapse of the operation period tb of the sound producing operation by the motor 11*a* of the driver seat, that is, after a further lapse of the operation period tb after the lapse of the standby period ta, the sound producing operation of the operation period tb by the motor 11b (motor body 12) of the passenger seat is set. After the lapse of the operation period tb of the sound producing operation by the motor 11b of the passenger seat, that is, after a further lapse of the double operation period tb after the lapse of the standby period ta, the sound producing operation of the operation period tb by the motor 11c (motor body 12) of the right rear seat is set. Subsequently, after the lapse of the operation period tb of the sound producing operation by the motor 11c of the right rear seat, that is, after a further lapse of the triple operation period tb after the lapse of the standby period ta, the sound producing operation of the operation period tb by the motor 11d (motor body 12) of the left rear seat is set. The motors 11a to 11d are configured to be synchronized by communication connection with the body ECU 21 and thus may be implemented.

As described above, for example, when a sound production request occurs in all of the driver seat, the passenger seat, the right rear seat, and the left rear seat, the sound producing operation is performed by the motor bodies 12 of the motors 11a to 11d in an order of the driver seat, the passenger seat, the right rear seat, and the left rear seat. For example, when a sound production request does not occur only in the passenger seat, a blank of the operation period tb corresponding to the sound producing operation of the passenger seat is generated between the sound producing operation of the driver seat and the sound producing operation of the right rear seat. When the sound production timing is shifted for each position as described above, sounds are easily distinguished from each other in a situation in which the sounds are produced in two or more positions.

In addition, in the sound producing operations of all of the driver seat, the passenger seat, the right rear seat, and the left rear seat, a PWM controller 14a of the P/W ECU 14 in each of the motors 11a to 11d turns on and off an FET 13b with a small duty corresponding to a minute voltage Va of about 0.5 V. At this time, the switching between an audible range and an inaudible range of a control frequency is repeated three times in all of the driver seat, the passenger seat, the right rear seat, and the left rear seat so that the audible range of, for example, 50 milliseconds is in a period (t1 omitted in FIG. 4) and the inaudible range of, for example, 150 milliseconds is in a period (t2 omitted in FIG. 4).

In this case, in the sound producing operations of the driver seat and the passenger seat, the control frequency of the audible range is set to 0.75 kHz, and the control frequency of the inaudible range is set to 20 kHz. In the sound producing operations of the right rear seat and the left rear seat, the control frequency of the audible range is set to 1.25 kHz, and the control frequency of the inaudible range is set to 20 kHz.

More specifically, the sound produced by minute vibration of the motor body 12 corresponds to a low-pitched sound when the control frequency is low and a high-pitched sound when the control frequency is high. For this reason, the difference in pitch facilitates the distinguishing between the sound produced at the side of the driver seat or the passenger seat and the sound produced at the side of the right rear seat or the left rear seat. In addition, when a place where a sound is difficult to hear is set to the high-pitched sound side, the sound may be easy to hear.

As described above, in the power window system 10a of the present embodiment, the sound production timings of the driver seat, the passenger seat, the right rear seat, and the left rear seat do not overlap each other. Further, the pitch of the driver seat and the passenger seat differs from the pitch of the right rear seat and the left rear seat. Thus, it is easy to identify which one of the motor bodies 12 of the motors 11a to 11d is producing sound. This allows a subsequent action to be easily taken on the window glass WG.

As described above, the pitch may be changed to a low-pitched sound when the control frequency of the audible range of the PWM controller 14a is lowered and a high-pitched sound when the control frequency is increased. In addition, the sound volume is changed to a larger volume when the minute voltage Va is increased and a smaller volume when the minute voltage Va is decreased. The sound production timing is changed, a sound production length (the operation period tb or the period t1) is changed, and the switching of the control frequency between the audible range and the inaudible range is repeated three times. The combination of these sound productions may be changed so that the position corresponding to the one of the driver seat, the passenger seat, the right rear seat, and the left rear seat that produces the sound is further clearly identified.

Next, advantageous effects of the second embodiment will be described.

(4) In the second embodiment, the same effects as effects (1) to (3) of the first embodiment described above may be obtained.

(5) The power window system 10a of the second embodiment is a system for a vehicle having four doors DR1 to DR4. When at least one of the sound volume, the pitch, the sound production timing, the sound production length, and the combination of the sound productions differs between two or more power window motors 11a to 11d, the one of the motor bodies 12 of the motors 11a to 11d that is producing sound is easily identified. In the present embodiment, the sound production timing is shifted in all of the driver seat, the passenger seat, the right rear seat, and the left rear seat. Additionally, the pitch of the driver seat and the passenger seat differs from the pitch of the right rear seat and the left rear seat. Thus, the position corresponding to the one of the motors 11a to 11d (the motor body 12) that is producing sound is easily identified.

Each of the first and second embodiments described above may be modified as below.

Numerical values used for the PWM control frequency, the periods ta, tb, t1, and t2, the voltage Va, etc. are mere examples and may be changed as appropriate.

The predetermined standby period ta is provided from the shifting to the sound production mode to when the sound producing operation is performed. However, the standby period ta may be omitted.

The drive circuit 13 includes the relay circuit 13a and the FET 13b. However, the configuration of the drive circuit is not limited thereto. For example, a full-bridge type drive circuit using four semiconductor switching elements such as FETs or a half-bridge type drive circuit using two semiconductor switching elements may be used.

The subject that is opened and closed is the window glass WG, and the invention is applied to the power window motors 11 and 11a to 11d (the power window systems 10 and 10a) that open and close the window glass WG. However, the invention may be applied to another opening-closing body driving motor (opening-closing body driving system) of the vehicle, for example, a motor (system) that drives a sliding roof or a sliding door.

Figure 5:
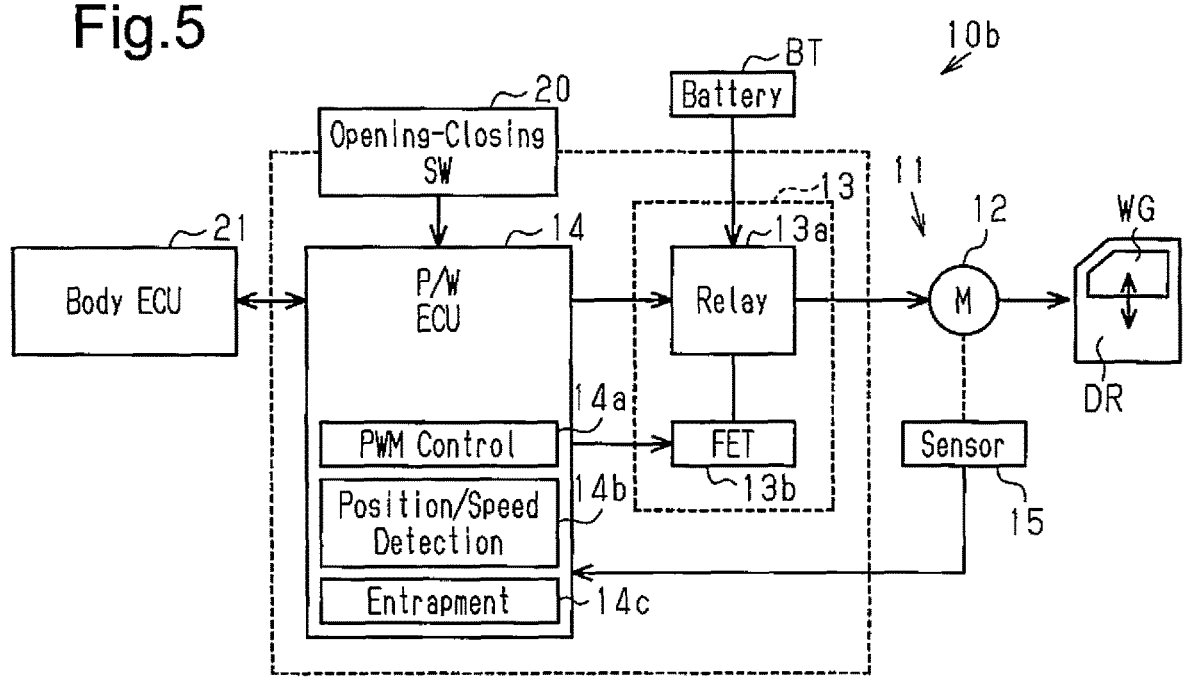
FIG. 5 is a schematic configuration diagram of a system including a power window motor in a modified example.

The drive circuit 13 and the P/W ECU 14 are integrally provided in the power window motor 11 (11a to 11d). However, for example, as in the power window system 10b illustrated in FIG. 5, the drive circuit 13 and the P/W ECU 14 may be integrally provided in the opening-closing switch 20. Accordingly, the power window motor 11 (11a to 11d) has a configuration in which the drive circuit 13 and the P/W ECU 14 are omitted.

Figure 6:
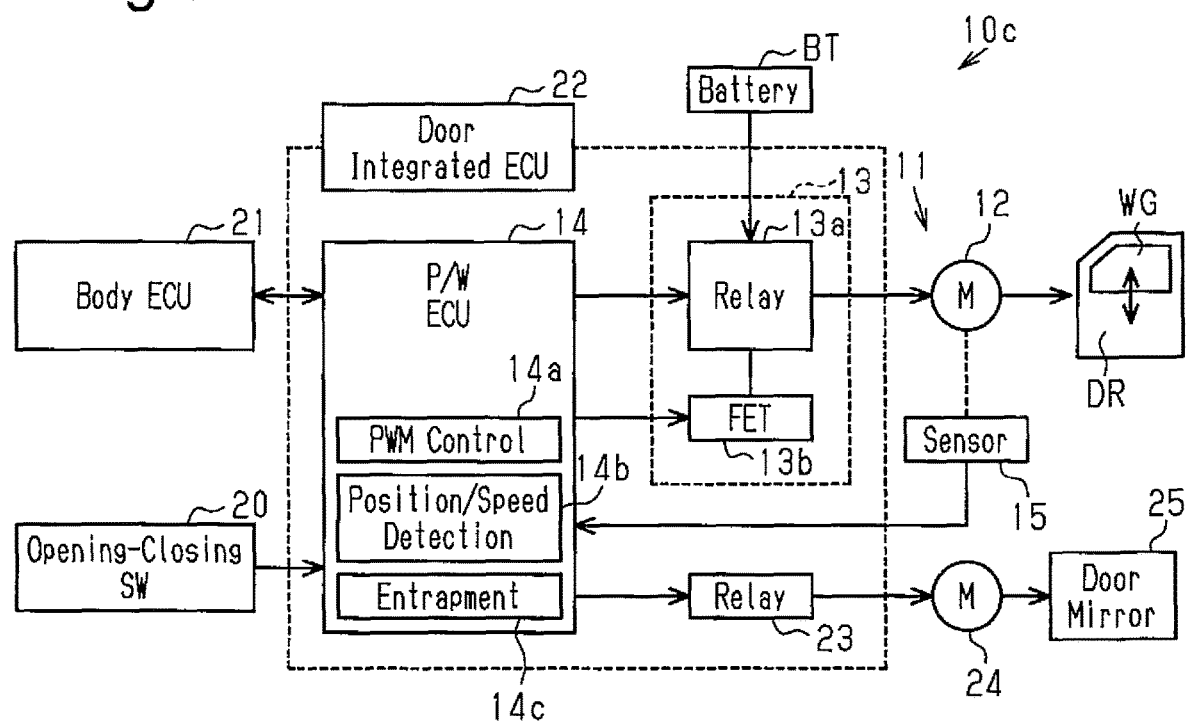
FIG. 6 is a schematic configuration diagram of a system including a power window motor in a modified example.

In addition, for example, in a system including a door integrated ECU 22 for integrally controlling electrical components related to the vehicle door DR (DR1 to DR4) as in the power window system 10c illustrated in FIG. 6, the drive circuit 13 and the P/W ECU 14 may be integrally provided in the door integrated ECU 22. Also, in this case, the power window motor 11 (11a to 11d) has a simple configuration. Further, the door integrated ECU 22 performs not only power window control but also, for example, various controls of a door mirror 25, and performs control through the relay circuit 23 and the motor 24 for each control subject.

Figure 7:
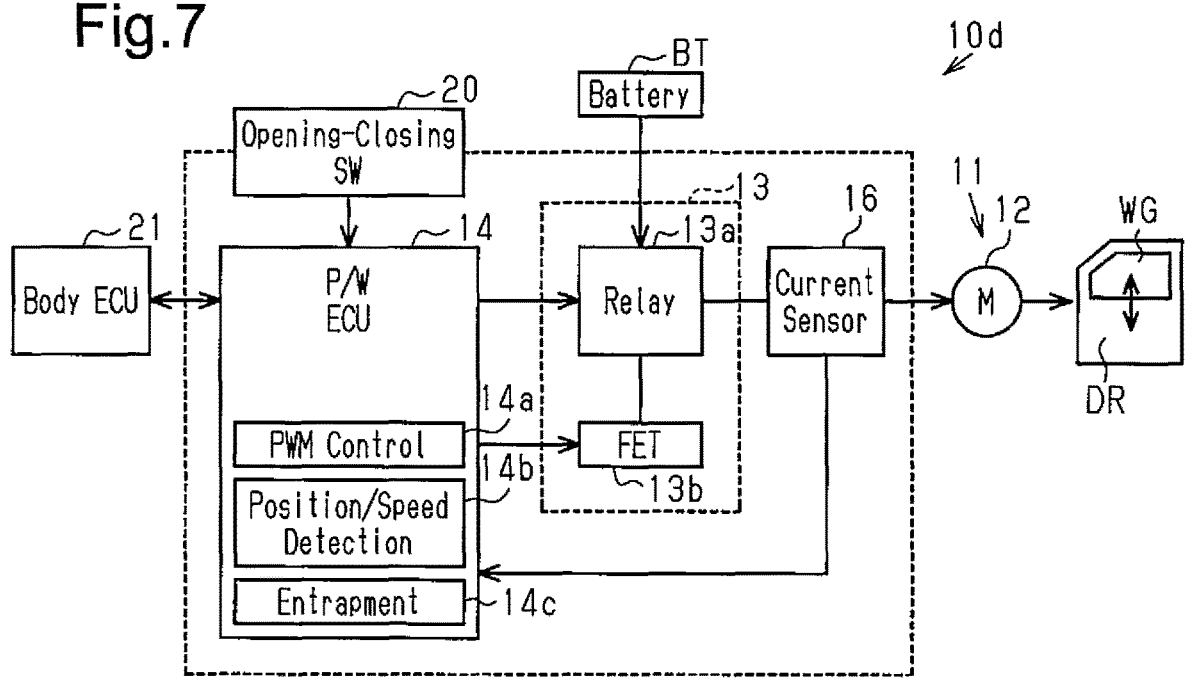
FIG. 7 is a schematic configuration diagram of a system including a power window motor in a modified example.

The position and the speed of the window glass WG are detected by the rotation sensor 15 obtaining rotation information of the motor body 12. However, for example, as in a power window system 10d illustrated in FIG. 7, a current sensor 16 capable of detecting a current ripple of the motor body 12 may be provided so that the position and the speed of the window glass WG (including detection of entrapment) are detected through the current sensor 16. The configuration of FIG. 7 is based on the configuration of FIG. 5.

Figure 8:
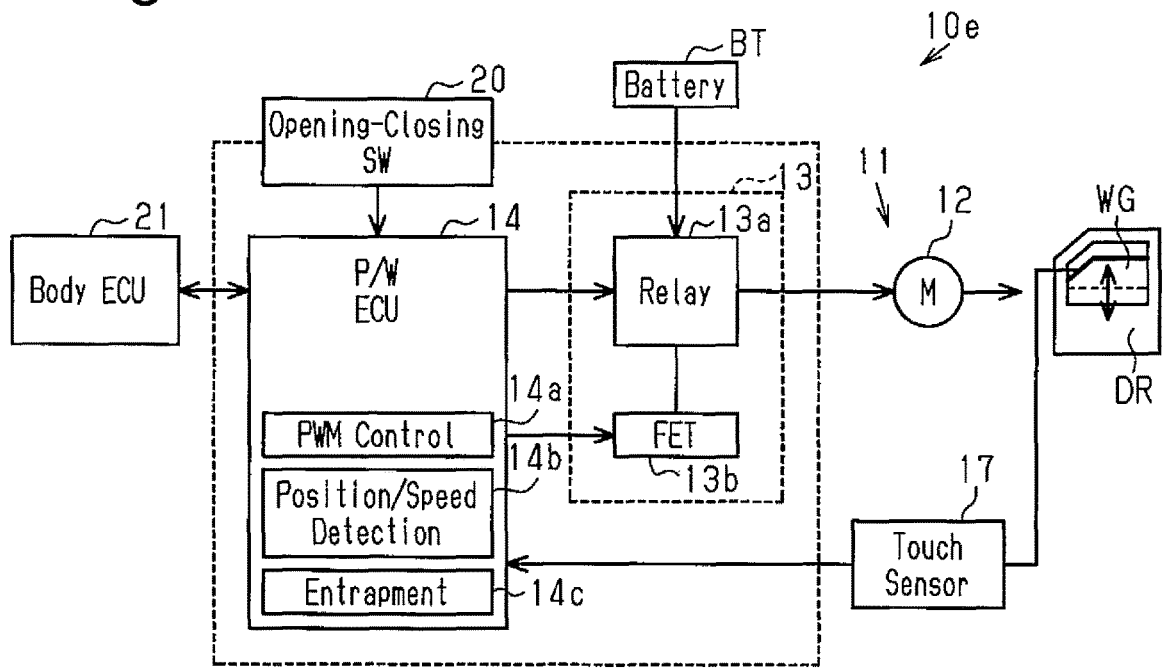
FIG. 8 is a schematic configuration diagram of a system including a power window motor in a modified example.

In addition, for example, as in a power window system 10e illustrated in FIG. 8, a touch sensor 17 capable of detecting a fully closed position of the window glass WG (sensor that detects contact of the window glass WG with a door frame at a fully closed position) may be provided so that the fully closed position of the window glass WG is detected through the touch sensor 17. The configuration of FIG. 8 is also based on the configuration of FIG. 5.

Figure 9:
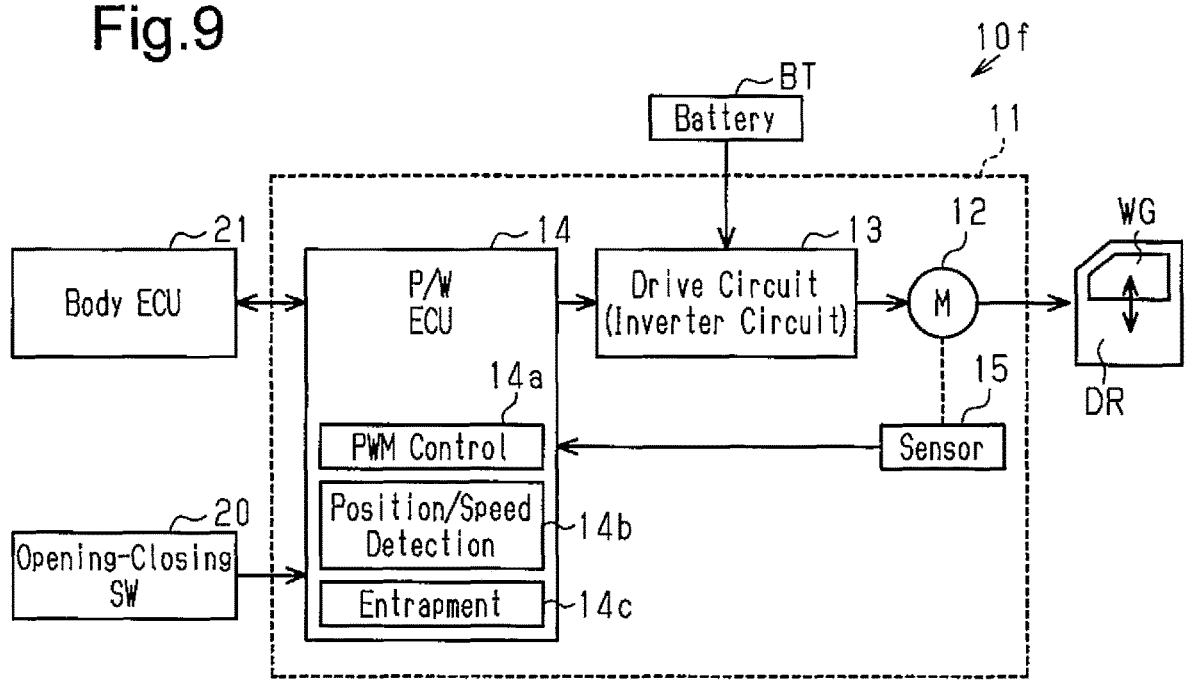
FIG. 9 is a schematic configuration diagram of a system including a power window motor in a modified example.
Figure 10:
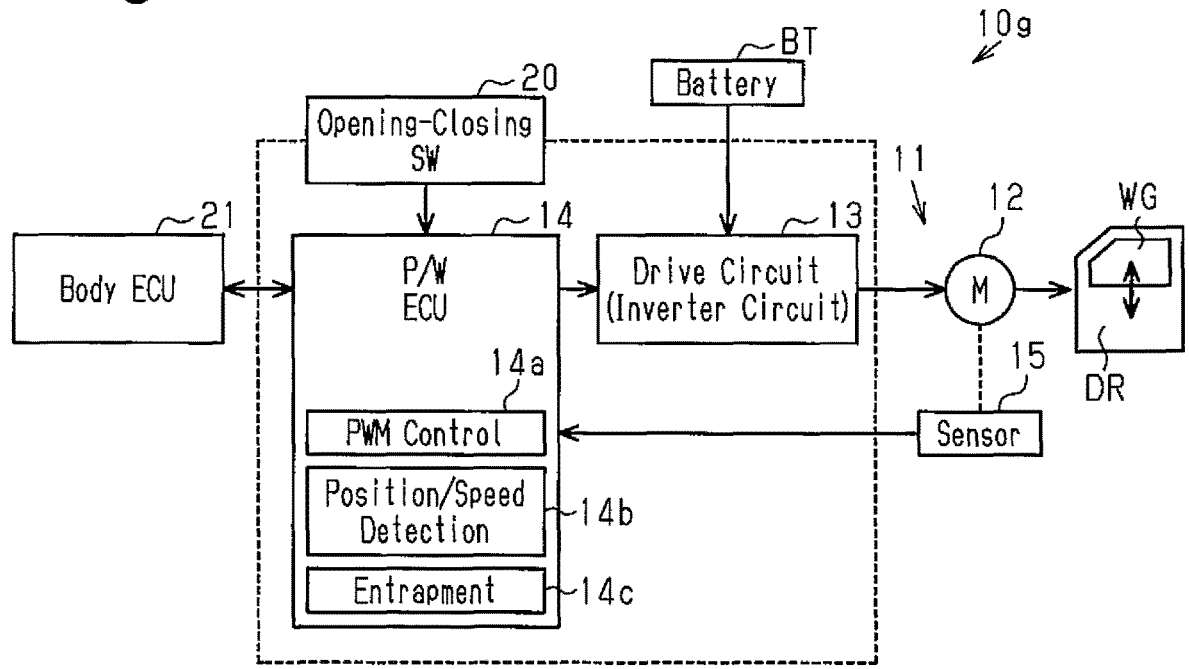
FIG. 10 is a schematic configuration diagram of a system including a power window motor in a modified example.

Although not specifically described, a brushed motor or a brushless motor is used for the motor body 12 of the power window motor 11 (11a to 11d). For example, in power window systems 10f and 10g illustrated in FIG. 9 and FIG. 10, a brushless motor is used for a motor body 12, and a drive circuit 13 has an inverter circuit including a full-bridge of FETs, etc. The system 10f of FIG. 9 has a configuration in which the drive circuit 13 and the P/W ECU 14 are integrally provided in a power window motor 11 (11a to 11d) (based on the configuration of FIG. 1). The system 10g of FIG. 10 has a configuration in which the drive circuit 13 and the P/W ECU 14 are integrally provided in the opening-closing switch 20 (based on the configuration of FIG. 5).

Combinations of the embodiments and the modified examples may be appropriately changed.

Third Embodiment

Hereinafter, a description will be given of a third embodiment of a power window system as an opening-closing body driving system. A power window system 10 of the third embodiment has the same configuration as that of the power window system 10 of the first embodiment illustrated in FIG. 1. A detailed description of the configuration of the power window system 10 will be omitted.

A description will be given of an operation (action) of the power window system 10 of the third embodiment.

Figure 11:
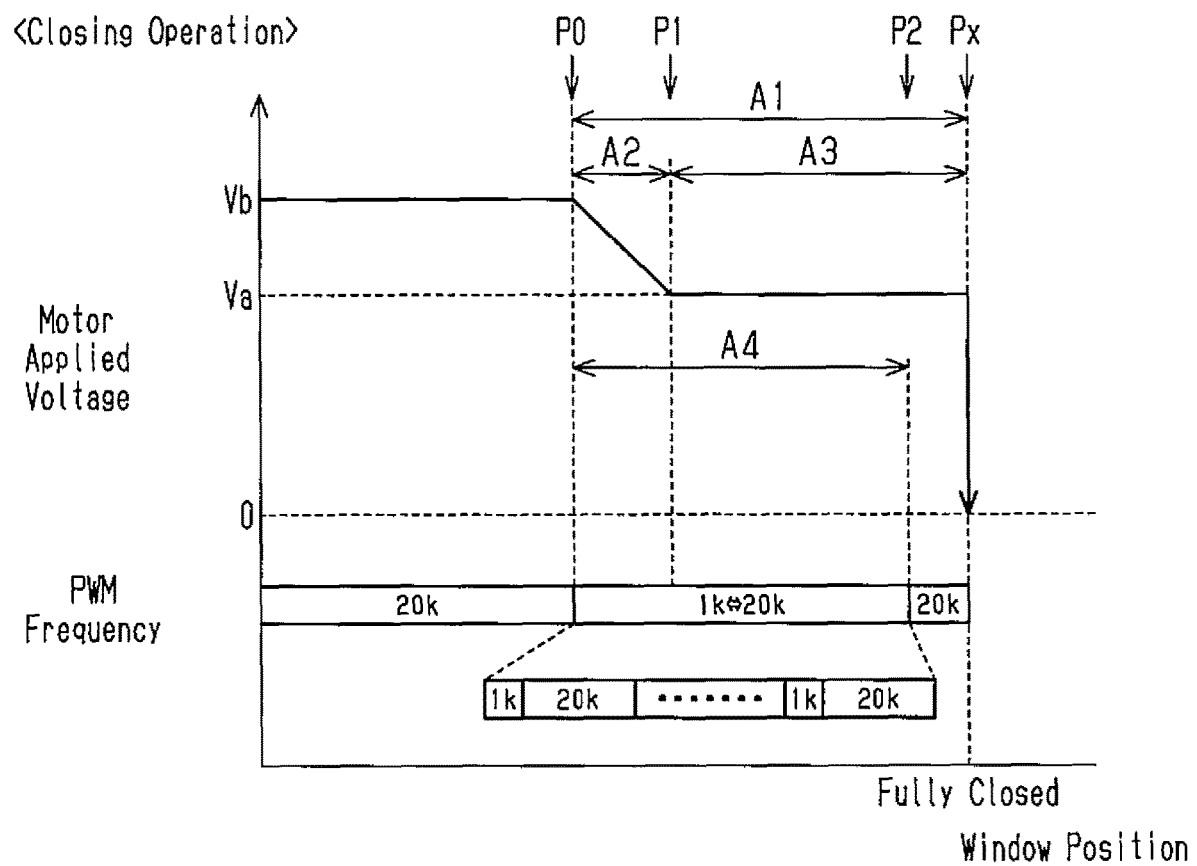
FIG. 11 is an explanatory diagram for description of an operation in a third embodiment of the invention.

While recognizing the opening-closing position of a window glass WG, a P/W ECU 14 adjusts driving power (motor applied voltage) supplied from a drive circuit 13 to a motor body 12 by PWM control of an FET 13b, thereby controlling the speed of an opening-closing operation of the window glass WG. In a case of closing the window glass WG, as illustrated in FIG. 11 (position of the window glass WG is written as window position), the P/W ECU 14 performs slow stop control in which the speed is reduced from a normal speed in a predetermined mode in a section close to the fully closed position.

In the entire process of the opening-closing operation of the window glass WG, about one-third of the section that is close to the fully closed position including a fully closed position Px is set to a slow stop section A1. The slow stop section A1 is a section from a slow start position P0 at which slow stop is started to the fully closed position Px. In addition, in the slow stop section A1, a predetermined position closer to the slow start position P0 (position at about one-fourth of the slow stop section A1) is set as a first position P1, and a predetermined position closer to the fully closed position Px (position at about one-sixth of the slow stop section A1) is set as a second position P2.

The window glass WG is closed at a normal speed before the slow stop section A1. When the window glass WG reaches the slow start position P0, the operating speed of the window glass WG is gradually reduced from the normal speed to a predetermined low speed until the subsequent first position P1 is reached, which defines a deceleration section A2. When the window glass WG reaches the first position P1, the operating speed of the window glass WG is constant at the predetermined low speed until the subsequent second position P2 is passed and the fully closed position Px is reached, which defines a low speed constant section A3.

In performing the speed control of the above mode, when the window glass WG is closed at the normal speed before the slow stop section A1, a PWM controller 14a keeps the FET 13b on (duty 100%). That is, the PWM controller 14a sets a motor applied voltage to the motor body 12 to a battery voltage Vb (about 12 V). Even when the FET 13b is kept on (duty 100%), a control frequency of the PWM control is set to about 20 kHz.

Subsequently, when a speed that is lower than the normal speed is set in the slow stop section A1, the PWM controller 14a adjusts the duty from 100% to a lower side and turns on and off the FET 13b. In the deceleration section A2, which is from the slow start position P0 to the first position P1, the PWM controller 14a gradually lowers the duty from 100% to a % (for example, 50%). That is, the PWM controller 14a controls the motor applied voltage to gradually lower from the battery voltage Vb (about 12 V) to a low-speed driving voltage Va (for example, 6 V). In the low speed constant section A3, which is from the first position P1 to the fully closed position Px, the PWM controller 14a fixes the duty at a %. That is, the PWM controller 14a controls the motor applied voltage to be constant at the low-speed driving voltage Va (for example, 6 V).

In the section that is close to the fully closed position including the fully closed position Px of the window glass WG and defined as the slow stop section A1, the fully closed position Px corresponds to a mechanical lock position. When the window glass WG is mechanically locked at the fully closed position Px, impacts may be reduced by shutting at a speed lower than the normal speed. In addition, when the window glass WG is performing a closing operation, an object may be caught between the vehicle door DR and the window glass WG. The slow stop section A1, which is provided to close the window glass WG at a low speed, reduces situations in which an object is caught.

Further, the inventor desires to produce a sound and notify the occupant, etc. that the window glass is fully closed, an object may be caught, etc. in the section close to the fully closed position of the window glass WG. However, it is troublesome to connect a power window motor 11 (P/W ECU14) to an existing in-vehicle speaker, etc. for notifying the occupant with a produce sound. Additionally, installation of a separate sound producing device in a vehicle is not desirable.

In this regard, the turning on and off of the FET 13b by PWM control in the slow stop section A1 is focused on. In the third embodiment, for example, about 1 kHz in an audible range is used as a control frequency of the PWM controller 14a in a section between the slow start position P0 and the second position P2, which is before the fully closed position Px, defining a sound producing operation section A4.

More specifically, in the sound producing operation section A4, the PWM controller 14a switches the control frequency from 1 kHz→20 kHz → . . . →1 kHz→20 kHz. A period corresponding to 1 kHz is, for example, 50 milliseconds, and a period corresponding to 20 kHz is, for example, 150 milliseconds. The periods are repeated two or more times in the sound producing operation section A4. Thus, the vibration generated in the motor body 12 corresponds to a frequency corresponding to 1 kHz in the period of 1 kHz and a frequency corresponding to 20 kHz in the period of 20 kHz.

In other words, vibration of the motor body 12 becomes a sound within a human audible range in the period in which the control frequency is 1 kHz. In the period corresponding to 20 kHz, vibration of the motor body 12 is in an inaudible range and thus cannot be heard as a sound by a human being. Further, in the sound producing operation section A4, switching of the control frequency from 1 kHz to 20 kHz is repeated a number of times, and thus a sound is produced each time the period corresponding to 1 kHz is reached. As described above, in the third embodiment, using the section where PWM control is performed to change the speed of the window glass WG, the power window motor 11 (the motor body 12) performs a sound producing operation so that notification to the occupant, etc. is performed.

Next, advantageous effects of the third embodiment will be described.

(6) In the section A4 in which the FET 13b of the drive circuit 13 is turned on and off by adjustment of PWM control to operate the window glass WG at a low speed, a frequency (for example, 1 kHz) in the audible range is included in a control frequency of PWM control so that the motor body 12 vibrates in the audible range, thereby performing the sound producing operation. With the sound produced by the motor body 12, the occupant, etc. may be notified of a predetermined closing operation of the window glass WG (closing operation in the section 4). In addition, sound production and notification in the section A4 on the fully closed side of the window glass WG in the closing operation draws attention to an object that may be caught by the window glass WG and also may be used to confirm a closing operation by which the window glass WG is fully closed.

(7) Sound production by the motor body 12 is repeated twice or more in the sound producing operation section A4. Thus, the sound production by the motor body 12 may be easily noticed.

The third embodiment may be modified as below.

Sound production and notification are performed in the section A4 of the positions P0 to P2 of the window glass WG at the time of PWM control during the closing operation, which is merely an example and may be modified as appropriate.

Figure 12:
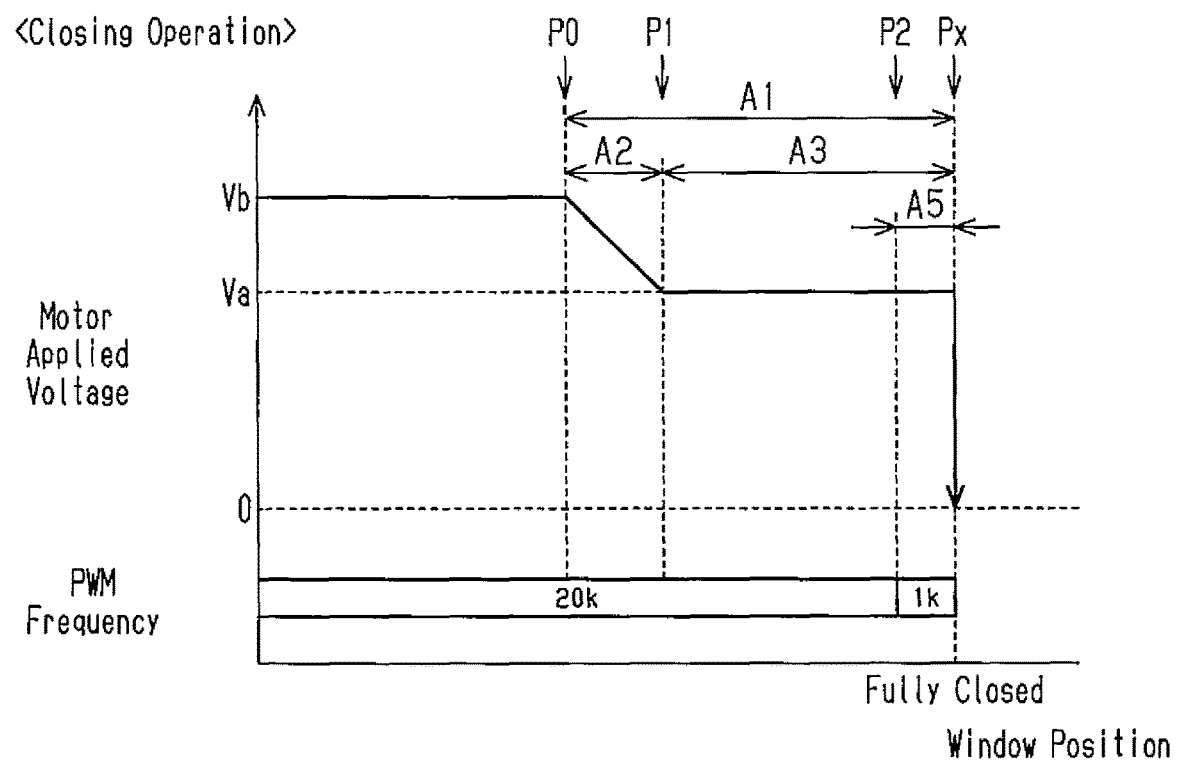
FIG. 12 is an explanatory diagram for description of an operation in a modified example.

For example, as illustrated in FIG. 12, in a fully closed section A5 including the fully closed position Px from the second position P2 to the fully closed position Px, the control frequency of the PWM control may be switched to a frequency (for example, 1 kHz) in an audible range. In this case, for example, the control frequency of the PWM control may be fixed at the frequency in the audible range, and the sound production and notification may be continued in the section A5. This may be used for, for example, confirmation of the fully closed state of the window glass WG.

Figure 13:
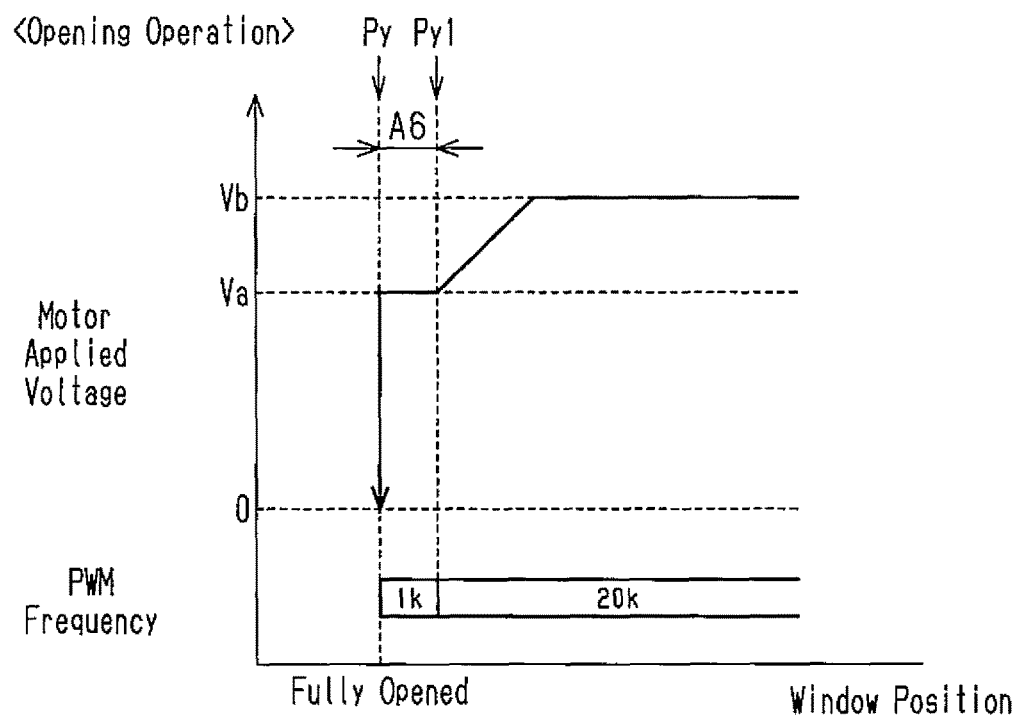
FIG. 13 is an explanatory diagram for description of an operation in a modified example.

In addition, as illustrated in FIG. 13, at the time of PWM control during the opening operation (at the time of low-speed operation), in a fully open section A6 from a forward position Py1 to a fully open position Py of the window glass WG including the fully open position Py, the control frequency of the PWM control may be switched to a frequency (for example, 1 kHz) in an audible range. In this case, for example, the control frequency of the PWM control may be fixed at the frequency in the audible range, and the sound production and notification may be continued in the section A6. This may be used for, for example, confirmation of a fully open state of the window glass WG.

In addition, at the time of initial setting of position detection of the window glass WG in the P/W ECU 14, the window glass WG may be required to be temporarily set at the fully open position Py and then close to the fully closed position Px. In this case, when the control frequency of the PWM control is locally switched to the audible range at the fully open position Py and the fully closed position Px of the window glass WG and sound production and notification are performed such that the respective positions Py and Px can be recognized as in modes of FIG. 13 and FIG. 12, the window glass WG is easily and surely disposed at the respective positions Py and Px. Thus, the initial setting is easily and surely performed.

Numerical values used for the PWM control frequency, the positions P0 to P2, the voltages Va and Vb, the duty ratio α, etc. are mere examples and may be appropriately changed.

The drive circuit 13 includes the relay circuit 13a and the FET 13b. However, the configuration of the drive circuit is not limited thereto. For example, a full-bridge type drive circuit using four semiconductor switching elements such as FETs or a half-bridge type drive circuit using two semiconductor switching elements may be used.

The subject that is opened and closed is the window glass WG, and the invention is applied to the power window motor 11 (the power window system 10) opening and closing the window glass WG. However, the invention may be applied to another opening-closing body driving motor (opening-closing body driving system) of the vehicle, for example, a motor (system) that drives a sliding roof or a sliding door.

Similarly to the first embodiment, the configuration of the third embodiment is applicable to the configurations of FIGS. 5 to 10. A detailed description of the configurations of FIGS. 5 to 10 is the same as that of the first embodiment and thus will be omitted.

Fourth Embodiment

Hereinafter, a description will be given of a fourth embodiment of a power window system as an opening-closing body driving system. A power window system 10 of the fourth embodiment has the same configuration as that of the power window system 10 of the first embodiment illustrated in FIG. 1. A detailed description of the configuration of the power window system 10 will be omitted.

A description will be given of an operation (action) of the power window system 10 of the fourth embodiment.

A P/W ECU 14 performs control similar to the control illustrated in FIG. 11 of the third embodiment. Specifically, as illustrated in FIG. 11 (position of a window glass WG is written as window position), the P/W ECU 14 performs slow stop control in which the speed is reduced in a predetermined mode from a normal speed in a section close to a fully closed position. Since the slow stop control is the same as that in the third embodiment, a detailed description thereof will be omitted.

When the control frequency of PWM control by a PWM controller 14a is repeated at 1 kHz and 20 kHz in the sound producing operation section A4 of FIG. 11, there is a slight concern of whether the effect on driving of a motor body 12 is small.

Figure 14:
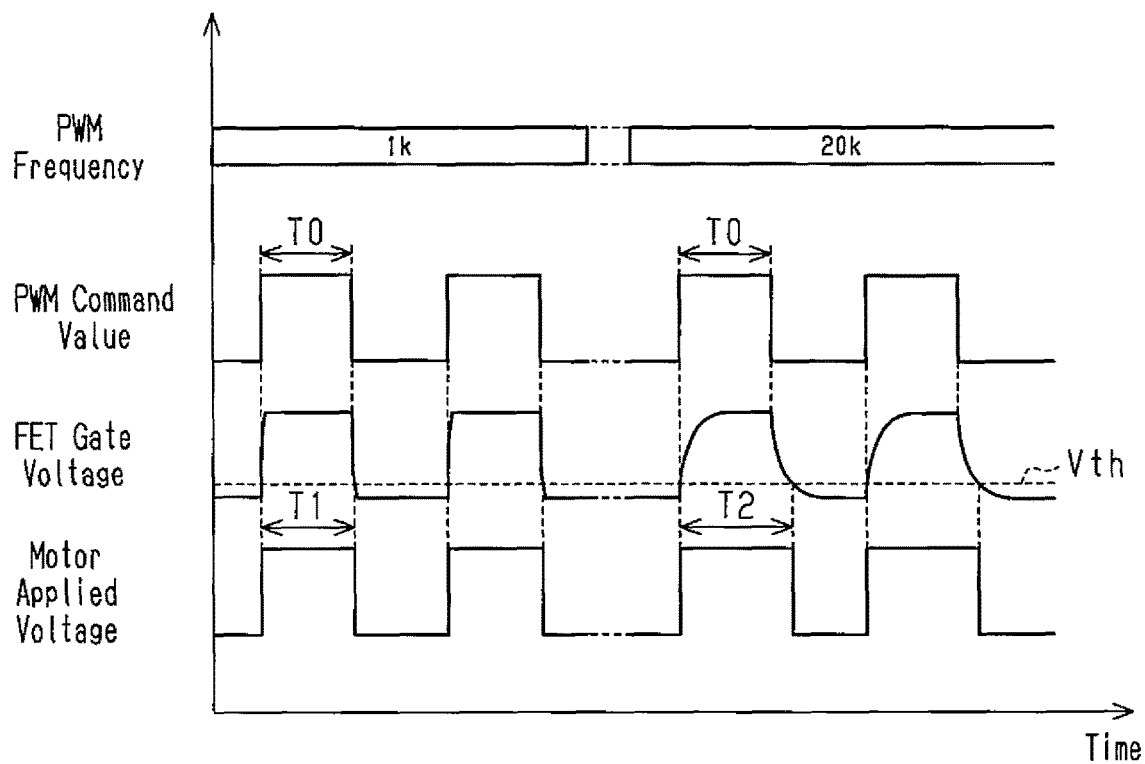
FIG. 14 is an explanatory diagram for description of a relationship between a PWM control frequency and a motor applied voltage in a fourth embodiment of the invention.

FIG. 14 illustrates the relationship between a PWM control frequency and a motor applied voltage when a duty of on-off drive of an FET 13b (duty of a PWM control signal) is set to, for example, 50%.

A PWM command value for the PWM controller 14a corresponds to an ON period T0 that is the same for when the control frequency of the PWM control is 1 kHz and 20 kHz. The PWM controller 14a generates a PWM control signal based on the PWM command value and provides the PWM control signal to a control terminal of the FET 13b. The FET 13b is turned on and off based on the PWM control signal input to the control terminal (gate), in this case, a control terminal voltage (gate voltage). The gate voltage that is supplied to the FET 13b in this manner is distorted such that a rising edge and a falling edge become somewhat gentle in the course of the supply.

In this instance, when the control frequency of the PWM control is 20 kHz rather than 1 kHz, on-off switching (switching speed) is faster and an edge change is gentler with respect to time change. For this reason, in relation to a threshold value Vth for switching on the FET 13b, an ON period T2 of the FET 13b at the control frequency of 20 kHz is longer than an ON period T1 of the FET 13b at 1 kHz, and a voltage application time with respect to the motor body 12 is relatively long at the control frequency of 20 kHz.

Figure 15:
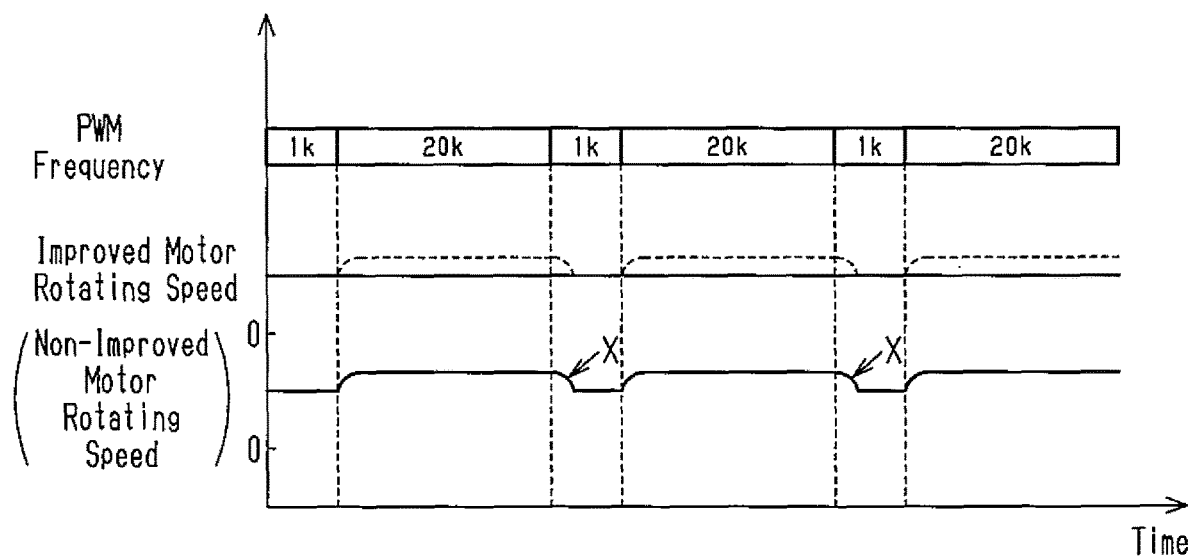
FIG. 15 is an explanatory diagram for description of a relationship between a PWM control frequency and a motor rotation speed in the embodiment.

In other words, even though the same PWM command value is used, since the motor applied voltage is higher at the control frequency of the PWM control of 20 kHz, a rotation speed of the motor body 12 is relatively high at the control frequency of 20 kHz as in a non-improved motor rotation speed illustrated in FIG. 15. This results in different rotation speeds for each control frequency. In particular, when entrapment by the window glass WG is detected based on a decrease in rotation speed of the motor body 12 as in the present embodiment, a decrease in rotation speed of the motor body 12 immediately after switching of the control frequency from 20 kHz to 1 kHz as in a place indicated by an arrow X in FIG. 15 should not be erroneously detected as entrapment by the window glass WG. The switching of the control frequency of the PWM control slightly increases a risk of erroneous detection of entrapment.

Taking this into consideration, an internal process of an entrapment processor 14c is improved in the fourth embodiment. More specifically, situations in which the same PWM command value is used when the control frequency of the PWM control is 1 kHz and 20 kHz are compared. When the control frequency of the PWM control is 1 kHz, the entrapment processor 14c sets the PWM command value to a duty of a PWM control signal without change. When the control frequency is 20 kHz, the entrapment processor 14c corrects the PWM command value so that the duty of a PWM control signal is slightly decreased. For example, in the case of the duty 50% illustrated in FIG. 14, the correction is made so that the ON period T2 at 20 kHz is shortened to the ON period T1 at 1 kHz.

That is, the duty of the PWM control signal is corrected so that the motor applied voltages are at the same level. As in an improved motor rotation speed illustrated in FIG. 15, there is no difference in the rotation speed of the motor body 12 even when the control frequency is switched to any one of the frequencies. Thus, while the control frequency of the PWM control is switched between 1 kHz and 20 kHz to perform sound production and notification, the risk of erroneous detection of entrapment is reduced at the time of switching of the control frequency of PWM control.

Figure 16:
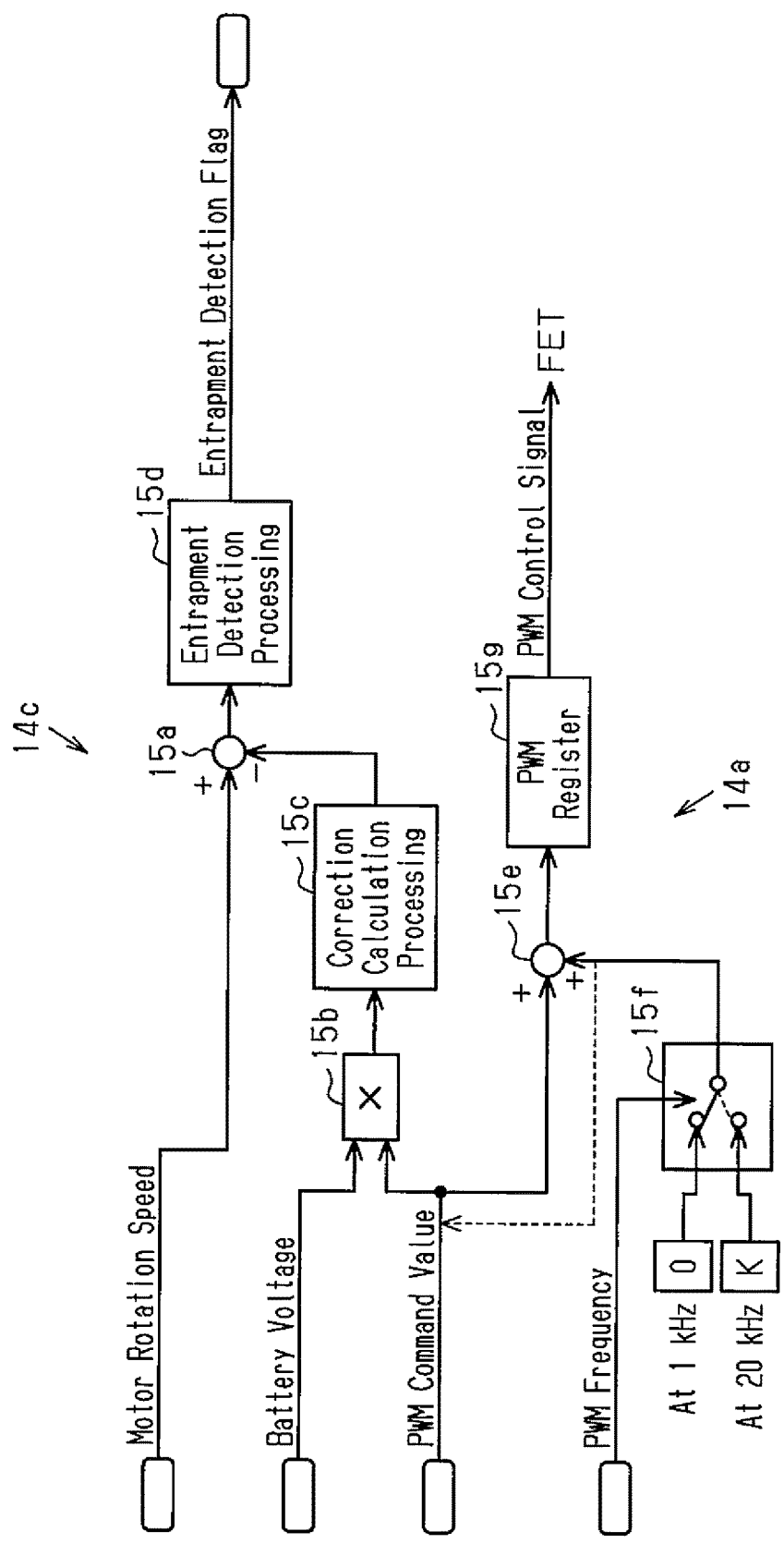
FIG. 16 is a block diagram illustrating a specific configuration of a PWM controller and an entrapment processor in the embodiment.

FIG. 16 is a specific configuration of the PWM controller 14a and the entrapment processor 14c. In the entrapment processor 14c, a rotation speed of the motor body 12 is input to a calculator 15a. In addition, a battery voltage Vb and a PWM command value are input to a calculator 15b, and the calculator 15a calculates a motor applied voltage. The calculated motor applied voltage is input to a correction calculating unit 15c, and the correction calculating unit 15c calculates a correction value related to a voltage variation. The calculated correction value related to the voltage variation is input to the calculator 15a.

That is, a rotation speed change caused by the voltage variation is excluded from the corrected motor rotation speed that is calculated by the calculator 15a. Therefore, an entrapment detecting unit 15d appropriately determines entrapment based on the corrected motor rotation speed.

In the PWM controller 14a, the PWM command value is input to a calculator 15e. In addition, in a correction value switching unit 15f, a correction value "0" is selected when the control frequency of the PWM control is 1 kHz, and the correction value "0" is input to the calculator 15e. When the control frequency is 1 kHz, the PWM command value is input to a PWM register 15g without change in the calculator 15e. When the control frequency of the PWM control is 20 kHz, a correction value "K" is selected, and the correction value "K" is input to the calculator 15e. More specifically, in the case of the control frequency of 20 kHz, in anticipation that an ON period of a gate voltage of the FET 13b extends when the control frequency is 20 kHz, correction is performed by addition of the correction value "K" (in this case, "K" is a negative value) to shorten to an ON period of a gate voltage at the time of 1 kHz. Thus, even when the control frequency of the PWM control is switched to any one of the frequencies, the same level of the motor applied voltage is applied when the PWM command value is the same. This obtains the same level of the rotation speed of the motor body 12.

Next, advantageous effects of the fourth embodiment will be described.

(8) In the section A4 in which the FET 13b of the drive circuit 13 is turned on and off by adjustment of PWM control to operate the window glass WG at a low speed, the control frequency of the PWM control includes a frequency (for example 1 kHz) in the audible range and is set to be variable so that the motor body 12 vibrates in the audible range, thereby performing the sound producing operation. In this instance, since the rotation speed of the motor body 12 varies due to the difference in control frequency, the variation of the rotation speed of the motor body 12 caused by the difference in control frequency is corrected, and PWM control is performed so that when the PWM command value is the same, the rotation speeds of the motor body 12 are at the same level irrespective of the control frequency. Thus, while minimizing the variation of the rotation speed of the motor body 12 caused by the variable control frequency of the PWM control, the sound production and notification are performed by switching the control frequency including the audible range.

(9) Since the control frequency of the PWM control is set to be variable for sound production and notification, the risk of the variation in the rotation speed of the motor body 12 increases. This increases the risk of erroneous determination when entrapment by the window glass WG is determined. Thus, the correction performed in accordance with the control frequency is very meaningful.

(10) Since sound production by the motor body 12 is repeated twice or more in the sound producing operation section A4, the sound production by the motor body 12 may be easily noticed. In addition, when the control frequency is configured to vary a number of times, a risk of the variation of the rotation speed of the motor body 12 and a risk of erroneous determination of entrapment further increase accordingly. Thus, application to the present embodiment in which the control frequency is configured to vary a number of times is very meaningful.

The fourth embodiment may be modified as below.

Sound production and notification are performed in the section A4 of the positions P0 to P2 of the window glass WG at the time of PWM control during the closing operation, which is merely an example and may be changed as appropriate. For example, sound production and notification may be performed, for example, in the fully closed section, which is from the second position P2 to the fully closed position Px including the fully closed position Px, and the fully open section, which is from the forward position to the fully open position including the fully open position.

Determination of entrapment by the window glass WG is made based on the rotation speed of the motor body 12. However, in addition to the comparison of rotation speeds, entrapment determination may be made using a parameter based on a motor rotation speed such as a rotation speed change amount.

As illustrated in FIG. 15, a correction value switched by the correction value switching unit 15*f* is input to the calculator 15*e* according to a difference in control frequency of the PWM control, and the PWM control is adjusted through the PWM control signal. However, as indicated by a broken line arrow of FIG. 15, the correction value switched by the correction value switching unit 15*f* may be input to the entrapment processor 14*c*, and the entrapment determination may be directly adjusted. The correction value switched by the correction value switching unit 15*f* may be input through the calculator to, for example, an input side of the PWM command value of the calculator 15*b*, an output side of the calculator 15*b* (input side of the correction calculating unit 15*c*), and an output side of the correction calculating unit 15*c* of the entrapment processor 14*c*.

Numerical values used for the PWM control frequency, the positions P0 to P2, the voltages Va and Vb, the duty ratio α, etc. are mere examples and may be appropriately changed.

The drive circuit 13 includes the relay circuit 13*a* and the FET 13*b*. However, the configuration of the drive circuit is not limited thereto. For example, a full-bridge type drive circuit using four semiconductor switching elements such as FETs or a half-bridge type drive circuit using two semiconductor switching elements may be used.

The subject that is opened and closed is the window glass WG, and the invention is applied to the power window motor 11 (the power window system 10) opening and closing the window glass WG. However, the invention may be applied to another opening-closing body driving motor (opening-closing body driving system) of the vehicle, for example, a motor (system) that drives a sliding roof or a sliding door.

Similarly to the first embodiment, the configuration of the fourth embodiment is applicable to the configurations of FIGS. 5 to 10. A detailed description of the configurations of FIGS. 5 to 10 is the same as that of the first embodiment and thus will be omitted.

Next, technical concepts which can be understood from the fourth embodiment and another example will be additionally described below.

(A) Provided is an opening-closing body driving motor including:

a motor body for automatically opening and closing an opening-closing body of a vehicle;

a drive circuit that supplies driving power to the motor body; and a control circuit including a PWM controller, the control circuit being configured to adjust the driving power by PWM control and control an operation mode of the opening-closing body through the motor body such that the operation mode is changeable.

The PWM controller is configured to perform a sound producing operation by having the control frequency in the PWM control include a frequency in an audible range and be variable so that the motor body vibrates in the audible range in a section where a switching element of the drive circuit is turned on and off. The PWM controller is also configured to perform the PWM control in which a variation of a rotation speed of the motor body caused by the difference in the control frequency is corrected so that when the PWM command value is the same, rotation speeds of the motor body are at the same level regardless of the control frequency.

(B) The opening-closing body driving motor according to clause (A), wherein the PWM controller of the control circuit is configured to perform the sound producing operation in which the control frequency of the PWM control is variable in a section where the switching element of the drive circuit is turned on and off to perform a closing operation.

The PWM controller includes an entrapment processor that determines entrapment by the opening-closing body based on a change in rotation speed of the motor body.

(C) The opening-closing body driving motor according to clause (A) or (B), wherein the PWM controller is configured to repeat switching between an audible range and an inaudible range of the control frequency of the PWM control at least twice or more in the section for performing the sound producing operation in which the control frequency of the PWM control is variable.

(D) The opening-closing body driving motor according to any one of clauses (A) to (C), wherein the opening-closing body, which is a subject that is opened and closed by the motor body, is a window glass provided in a vehicle door.

(E) The opening-closing body driving motor according to any one of clauses (A) to (D), wherein the motor body is a brushed motor.

(F) The opening-closing body driving motor according to any one of clauses (A) to (D), wherein the motor body is a brushless motor.

(G) Provided is an opening-closing body driving system including:

an opening-closing body driving motor including a motor body for automatically opening and closing an opening-closing body of a vehicle;

a drive circuit that supplies driving power to the motor body; and a control circuit including a PWM controller, the control circuit being configured to adjust the driving power by PWM control and control an operation mode of the opening-closing body through the motor body such that the operation mode is changeable.

The PWM controller is configured to perform a sound producing operation by having the control frequency in the PWM control include a frequency in an audible range and be variable so that the motor body vibrates in the audible range in a section where a switching element of the drive circuit is turned on and off. The PWM controller is also configured to perform the PWM control in which a variation of a rotation speed of the motor body caused by the difference in the control frequency is corrected so that when the PWM command value is the same, rotation speeds of the motor body are at the same level regardless of the control frequency.

(H) Provided is an opening-closing body driving motor including:

a motor body for automatically opening and closing an opening-closing body of a vehicle;

a drive circuit that supplies driving power to the motor body; and a control circuit including a PWM controller, the control circuit being configured to adjust the driving power by PWM control and control an operation mode of the opening-closing body through the motor body such that the operation mode is changeable.

The PWM controller is configured to perform a sound producing operation by having the control frequency in the PWM control include a frequency in an audible range and be variable so that the motor body vibrates in the audible range in a section where a switching element of the drive circuit is turned on and off to perform a closing operation.

The PWM controller includes an entrapment processor that determines entrapment by the opening-closing body based on a change in rotation speed of the motor body.

The entrapment processor is configured to correct a vibration of the rotation speed of the motor body caused by a difference in the control frequency to determine entrapment of the same mode regardless of the control frequency.

(I) Provided is an opening-closing body driving system including:

an opening-closing body driving motor including a motor body for automatically opening and closing an opening-closing body of a vehicle;

a drive circuit that supplies driving power to the motor body; and a control circuit including a PWM controller, the control circuit being configured to adjust the driving power by PWM control and control an operation mode of the opening-closing body through the motor body such that the operation mode is changeable.

The PWM controller is configured to perform a sound producing operation by having the control frequency in the PWM control include a frequency in an audible range and be variable so that the motor body vibrates in the audible range in a section where a switching element of the drive circuit is turned on and off to perform a closing operation.

The PWM controller includes an entrapment processor that determines entrapment by the opening-closing body based on a change in rotation speed of the motor body.

The entrapment processor corrects a vibration of the rotation speed of the motor body caused by a difference in the control frequency to determine entrapment of the same mode regardless of the control frequency.

According to configurations described in clauses (H) and (I), the control frequency of the PWM control is set to be variable for sound production and notification. This increases a risk of the variation of the rotation speed of the motor body and a risk of erroneous determination when entrapment by the opening-closing body is determined. Thus, when entrapment determination is made in the same mode irrespective of the control frequency, the risk of erroneous determination of entrapment may be reduced.

Fifth Embodiment

Hereinafter, a description will be given of a fifth embodiment of a power window system as an opening-closing body driving system.

Figure 17:
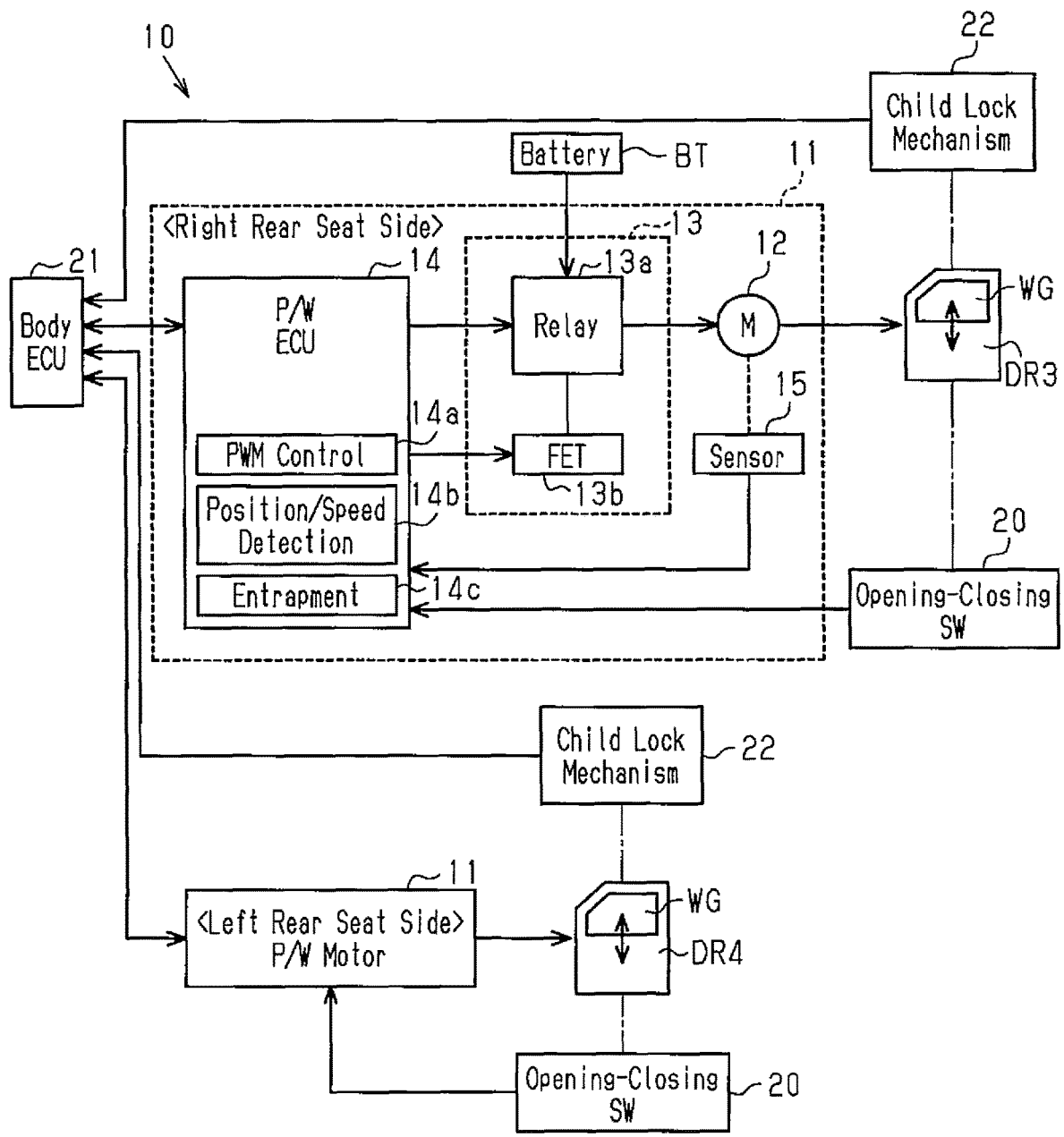
FIG. 17 is a schematic configuration diagram of a system including a power window motor in a fifth embodiment of the invention.

As illustrated in FIG. 17, a power window system 10 mounted in a vehicle includes a power window motor 11 as an opening-closing body driving motor mounted in each of doors DR3 and DR4 to automatically open and close a window glass WG of each of right and left vehicle doors (right rear seat door DR3 and left rear seat door DR4) at a vehicle rear seat, and a body electric control unit (ECU) 21 connected to the power window motor 11 for each of the doors DR3 and DR4 such that communication is allowed.

Each power window motor 11 is configured by integrally coupling a motor body 12, a drive circuit 13, and a power window ECU (P/W ECU) 14 as a control circuit.

A control circuit (circuitry) can be realized by one or more dedicated hardware circuits such as an ASIC, one or more processing circuits operating according to a computer program (software), or a combination thereof. The processing circuit has a CPU and a memory (ROM, RAM, etc.) storing a program executed by the CPU. The memory, that is, a computer-readable medium includes all types of available media that can be accessed by a general-purpose or dedicated computer.

FIG. 17 illustrates a specific configuration of the power window motor 11 of the right rear seat door DR3 as a representative. Since the power window motors 11 of the right rear seat door DR3 and the left rear seat door DR4 have the same configuration, illustration and a detailed description of a specific configuration of the power window motor 11 of the left rear seat door DR4 will be omitted.

The motor body 12 is driven to rotate based on supply of driving power from the drive circuit 13, and opens and closes the window glass WG in a vertical direction via a window regulator (not illustrated).

The drive circuit 13 includes a relay circuit 13a and a field effect transistor (FET) 13b as a switching element. The relay circuit 13a is a circuit that receives power supplied from a battery BT mounted in the vehicle and supplies and stops driving power for forward and reverse driving with respect to the motor body 12. In addition, the FET 13b, which serves as a semiconductor switching element, undergoes pulse width modulation (PWM) control and adjusts driving power that is output from the relay circuit 13a. In more detail, the relay circuit 13a performs forward or reverse rotation driving of the motor body 12 and stops the driving thereof, that is, performs an operation in an opening or closing direction of the window glass WG and stops the operation, and the FET 13b changes a rotation speed of the motor body 12, that is, changes an operating speed of the window glass WG. The relay circuit 13a and the FET 13b are controlled by the P/W ECU 14.

The P/W ECU 14 includes a PWM controller 14a, a position/speed detector 14b, and an entrapment processor 14c. The P/W ECU 14 performs various control operations related to an opening-closing operation of the window glass WG using the PWM controller 14a, the position/speed detector 14b, the entrapment processor 14c, etc. When various control operations are performed, a rotation pulse signal synchronized with rotation of the motor body 12 is input to the P/W ECU 14 from a rotation sensor 15. In addition, an opening or closing command signal from an opening-closing switch 20 included in each of the doors DR3 and DR4, etc. is input to the P/W ECU 14.

The P/W ECU 14 switches the relay circuit 13a to a power feedable state (ON) in a feeding direction for rotating the motor body 12, for example, in a forward direction in the case of input of an opening command signal and in a feeding direction for rotating the motor body 12, for example, in a reverse direction in the case of input of a closing command signal. In addition, in this case, the PWM controller 14a of the P/W ECU 14 sends a PWM control signal to a control terminal of the FET 13b, and switches the FET 13b so that the FET 13b is kept in an ON state (duty 100%) or turned on and off (duty variable) at a predetermined frequency. When there is no input of the opening-closing command signal, the P/W ECU 14 suspends (OFF) the supply of power to the motor body 12 with respect to the relay circuit 13a, and the PWM controller 14a turns off the FET 13b through a PWM control signal.

The position/speed detector 14b detects a rotational position of the motor body 12, that is, a position of the window glass WG based on the rotation pulse signal synchronized with rotation of the motor body 12, specifically, edge count of a pulse signal. Position information of the window glass WG is stored in a memory (not illustrated) in the P/W ECU 14 each time. In addition, the position/speed detector 14b detects a rotation speed of the motor body 12 (operating speed of the window glass WG) similarly based on the rotation pulse signal, specifically, based on a length of a cycle of a pulse signal. As the rotation speed of the motor body 12 decreases, the cycle of the rotation pulse signal lengthens.

When the rotation speed of the motor body 12 in operation of closing the window glass WG decreases to a reference speed or below, the entrapment processor 14c determines that an object is entrapped between the window glass WG in the closing operation and the doors DR3 and DR4. In this case, when the operating speed of the window glass WG is changed during the operation in accordance with, for example, the position of the window glass WG, the reference speed for determining entrapment is also changed, accordingly. When it is determined that entrapment has occurred, the entrapment processor 14c controls the relay circuit 13a and the FET 13b to open the window glass WG, for example, by a predetermined amount so that the entrapped object can be released. The entrapment processor 14c may determine trapping of an object between the window glass WG in opening operation and the doors DR3 and DR4. In this case, the entrapment processor 14c controls the relay circuit 13a and the FET 13b to close the window glass WG, for example, by a predetermined amount so that the trapped object can be released.

The P/W ECU 14 of each power window motor 11 is connected to the body ECU 21 corresponding to a host ECU such that communication is allowed through a vehicle communication system. Examples of the vehicle communication system include local interconnect network (LIN) communication, controller area network (CAN) communication, etc. The P/W ECU 14 acquires various kinds of necessary vehicle information from the body ECU 21.

In addition, each of the doors DR3 and DR4 of the vehicle rear seat includes a child lock mechanism 26. For example, the child lock mechanism 26 has an operation lever (not illustrated) that can be operated while the doors DR3 and DR4 are opened, and a child lock can be activated or deactivated by an operation of the operation lever. In each of the doors DR3 and DR4 with the child lock activated, an opening operation from an indoor side is prohibited, and an opening operation from an outdoor side is permitted. A normal locking mechanism (not illustrated) is generally provided in each of the doors DR3 and DR4, and an opening operation of each of the doors DR3 and DR4 from the outdoor side is allowed when the door is not locked by the normal locking mechanism. When the child lock is activated, the opening operation of each of the doors DR3 and DR4 from the indoor side is prohibited irrespective of whether the door lock is activated or deactivated by the normal locking mechanism.

The child lock mechanism 26 of each of the doors DR3 and DR4 is electrically connected to the body ECU 21, and the child lock mechanism 26 sends activation-deactivation information of the child lock in each of the doors DR3 and DR4 to the body ECU 21. The body ECU 21 sends the child lock activation-deactivation information of both the doors DR3 and DR4 to the power window motor 11 (P/W ECU 14) of each of the right rear seat door DR3 and the left rear seat door DR4.

Next, a description will be given of an operation (action) of the power window system 10.

Figure 18:
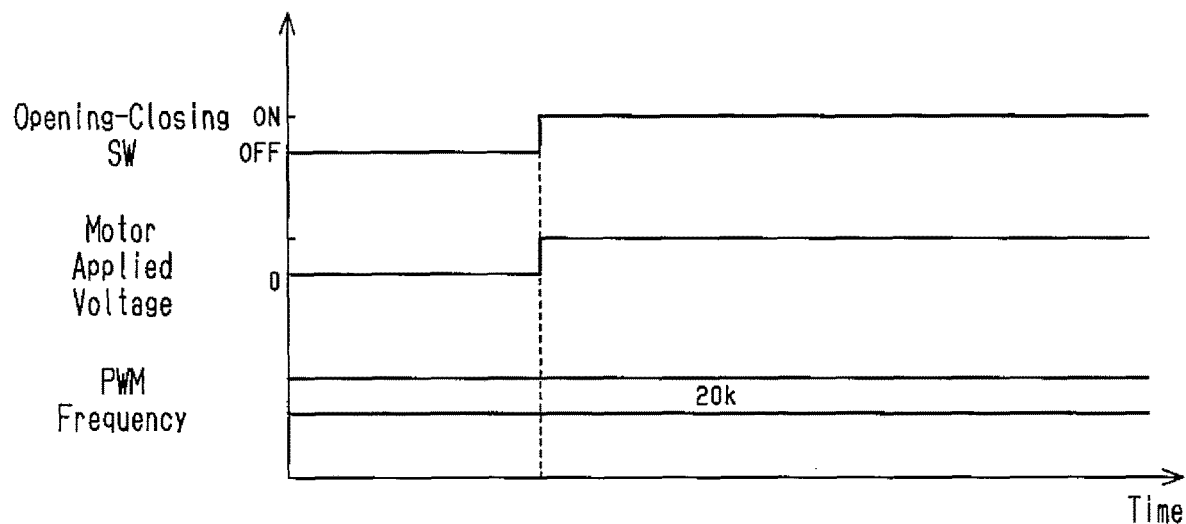
FIG. 18 is an explanatory diagram for description of an operation when a child lock of each door at a rear seat is deactivated in the embodiment.
Figure 19:
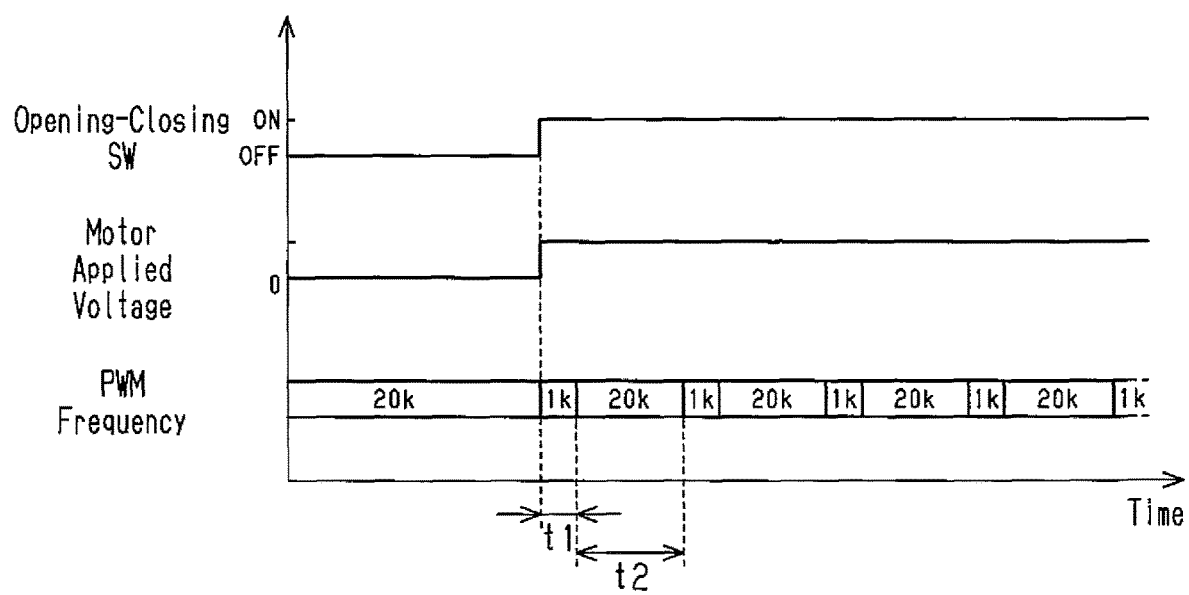
FIG. 19 is an explanatory diagram for description of an operation when a child lock of at least one door at the rear seat is activated in the embodiment.

As illustrated in FIG. 18 and FIG. 19, in response to receiving a command signal (opening or closing command signal) based on an activation of the opening-closing switch 20, the P/W ECU 14 of each power window motor 11 operates the relay circuit 13a and the FET 13b of the drive circuit 13 to supply driving power (motor applied voltage) to the motor body 12. Consequently, the motor body 12 is driven to rotate, and the window glass WG is opened or closed by a driving force thereof. At this time, the control frequency of the PWM controller 14a differs between a case in which the child lock of each of the doors DR3 and DR4 is deactivated and a case in which the child lock of at least one of the doors DR3 and DR4 is activated.

As illustrated in FIG. 18, when the child lock of each of the doors DR3 and DR4 is deactivated, the PWM controller 14a keeps the control frequency constant at a frequency of a normal operation (about 20 kHz in the present embodiment).

On the other hand, as illustrated in FIG. 19, when the child lock of at least one of the doors DR3 and DR4 is activated, the PWM controller 14a includes a frequency in an audible range (about 1 kHz in the present embodiment) in the control frequency so that the motor body 12 vibrates in the audible range, thereby causing the motor body 12 to perform a sound producing operation. More specifically, the PWM controller 14a switches the control frequency from 1 kHz→20 kHz→1 kHz→20 kHz→1 kHz→20 kHz→ . . . . A period t1 corresponding to 1 kHz is, for example, 50 milliseconds, and a period t2 corresponding to 20 kHz is, for example, 150 milliseconds. Thus, the vibration of the motor body 12 corresponds to a frequency corresponding to 1 kHz in the period t1 of 1 kHz and a frequency corresponding to 20 kHz in the period t2 of 20 kHz.

In other words, vibration of the motor body 12 becomes a sound within a human audible range in the period t1 in which the control frequency is 1 kHz. In the period t2 corresponding to 20 kHz, vibration of the motor body 12 is in an inaudible range and thus cannot be heard as a sound by a human being. Further, in driving of the motor body 12 in this case, sound production occurs each time the period t1 of 1 kHz is reached. Thus, in each power window motor 11 of the present embodiment, at the time of driving in the case in which the child lock of at least one of the doors DR3 and DR4 is activated, the sound producing operation is performed by the power window motor 11 (the motor body 12) so that notification to the occupant, etc. is performed.

Next, advantageous effects of the fifth embodiment will be described.

(11) In the case in which the window glass WG is operated through the motor body 12 when the child lock of at least one of the doors DR3 and DR4 at the rear seat is activated, a frequency in an audible range (for example, 1 kHz) is included in the control frequency of the PWM control so that the motor body 12 vibrates in the audible range, thereby performing the sound producing operation. With the sound produced from the motor body 12, for example, the occupant in the driver seat, etc. may be notified of an operation of the window glass WG under a predetermined situation such as a situation in which a child is in the vehicle. In particular, when the child is in the vehicle, it is preferable to activate a child lock and a window lock (a function of prohibiting an operation of the window glass WG by an operation of the opening-closing switch 20 of each of the doors DR3 and DR4) in each of the doors DR3 and DR4 at the rear seat. In a case in which the child lock is activated and the window lock is not activated, when sound production and notification from the motor body 12 are performed at the time of operating the window glass WG at the rear seat, for example, the occupant in the driver seat may quickly notice that the window lock has not been activated. In addition, whether the child lock of at least one of the doors DR3 and DR4 is activated may be determined based on the sound produced from the motor body 12 when the window glass WG is operated.

In addition, in the present embodiment, in the case of operating the window glass WG when the child lock of at least one of the doors DR3 and DR4 at the rear seat is activated, the sound producing operation of the motor body 12 is performed. According to this configuration, even in a case in which the child lock is activated in only one of the doors DR3 and DR4 at the rear seat, the sound producing operation of the motor body 12 may be performed at the time of operating each window glass WG of each of the doors DR3 and DR4. This further contributes to improvement of safety.

(12) In the sound producing operation of the motor body 12, switching between the audible range and the inaudible range of the control frequency of the PWM control is repeated at least twice or more. Thus, sound production by the motor body 12 may be easily noticed.

The fifth embodiment may be modified as below.

In the fifth embodiment, switching between the audible range and the inaudible range of the control frequency of the PWM control is repeated at least twice or more in the sound producing operation of the motor body 12. However, the invention is not limited thereto, and the control frequency of the PWM control may be fixed at a frequency in the audible range so that the motor body 12 continues to produce sound during the operation of the window glass WG.

In the fifth embodiment, the power window motor 11 of each of the doors DR3 and DR4 at the rear seat performs the sound producing operation of the motor body 12 in the case in which the window glass WG is operated when the child lock of at least one of the doors DR3 and DR4 is activated. However, the invention is not limited thereto. For example, the power window motor 11 of each of the doors DR3 and DR4 may perform the sound producing operation of the motor body 12 in the case in which the window glass WG is operated when the child lock of the corresponding one of the doors DR3 and DR4 is activated. In this case, for example, in a case in which the child lock of the right rear seat door DR3 is activated and the child lock of the left rear seat door DR4 is deactivated, the sound producing operation is performed when the window glass WG of the right rear seat door DR3 is operated. The sound producing operation is not performed when the window glass WG of the left rear seat door DR4 is operated. Thus, in each of the right rear seat door DR3 and the left rear seat door DR4, whether the child lock is activated may be determined based on whether or not the sound producing operation of the motor body 12 is performed when the window glass WG is operated.

Although not particularly described in the fifth embodiment, the sound producing operation of the motor body 12 may be performed when the window glass WG of each of the doors DR3 and DR4 at the rear seat is operated by an operation of an opening-closing switch located on a driver seat door, etc.

In the fifth embodiment, the vehicle in which the child lock mechanism 26 is provided to each of the doors DR3 and DR4 at the rear seat has been described as an example. However, the invention is not particularly limited thereto, and the invention is applicable to a vehicle in which a child lock mechanism is provided to, for example, a passenger seat door in addition to each of the doors DR3 and DR4 at the rear seat.

Numerical values used for the PWM control frequency, the periods t1 and t2, etc. are mere examples and may be appropriately changed.

The drive circuit 13 includes the relay circuit 13a and the FET 13b. However, the configuration of the drive circuit is not limited thereto. For example, a full-bridge type drive circuit using four semiconductor switching elements such as FETs or a half-bridge type drive circuit using two semiconductor switching elements may be used.

The subject that is opened and closed is the window glass WG, and the invention is applied to the power window motor 11 (the power window system 10) opening and closing the window glass WG. However, the invention may be applied to another opening-closing body driving motor (opening-closing body driving system) of the vehicle, for example, a motor (system) that drives a sliding roof.

The first to fifth embodiments and the modified examples described above may be appropriately combined.

The invention claimed is:

1. An opening-closing body driving motor comprising:
   a motor body for automatically opening and closing an opening-closing body of a vehicle;
   a drive circuit that supplies driving power to the motor body; and
   a control circuit including a PWM controller, the control circuit being configured to adjust the driving power by PWM control and control an operation mode of the opening-closing body through the motor body such that the operation mode is changeable, wherein
   the PWM controller is configured to have a control frequency of the PWM control include a frequency in an audible range based on a predetermined trigger so that the motor body vibrates in the audible range, thereby performing a sound producing operation, the predetermined trigger includes information about an opening-closing state of the opening-closing body or information about activation and deactivation of a child lock, the control circuit is configured to shift from a normal mode to a sound production mode in response to a sound production request based on vehicle states including the opening-closing state of the opening-closing body and a getting-out state of the vehicle, and the PWM controller is configured to switch a motor applied voltage according to adjustment of the PWM control to a minute voltage such that the motor body minutely vibrates within an inoperative range of the opening-closing body based on the shift to the sound production mode, and perform a sound producing operation by changing the control frequency of the PWM control from an inaudible range to the audible range and minutely vibrating the motor body in the audible range.

2. The opening-closing body driving motor according to claim 1, wherein the PWM controller is configured to perform the sound producing operation after a predetermined standby period lapses from the shift to the sound production mode.

3. The opening-closing body driving motor according to claim 1, wherein the PWM controller repeats switching between the audible range and the inaudible range of the control frequency of the PWM control at least twice or more during the sound producing operation.

4. The opening-closing body driving motor according to claim 1, wherein the opening-closing body, which is a subject that is opened and closed by the motor body, is a window glass provided in a vehicle door.

5. The opening-closing body driving motor according to claim 1, wherein the motor body is a brushed motor.

6. The opening-closing body driving motor according to claim 1, wherein the motor body is a brushless motor.

7. An opening-closing body driving system comprising the opening-closing body driving motor according to claim 1, wherein
the opening-closing body is one of a plurality of opening-closing bodies,
the opening-closing body driving motor is one of a plurality of opening-closing body driving motors,
the plurality of opening-closing body driving motors is respectively provided for the plurality of opening-closing bodies, and
at least one of a sound volume correlated with a minute voltage applied to the motor body, a pitch correlated with the control frequency of the PWM control, a sound production timing, a sound production length, and a combination of a sound production differs between two or more of the opening-closing body driving motors during the sound producing operation.

8. An opening-closing body driving motor comprising:
a motor body for automatically opening and closing an opening-closing body of a vehicle;
a drive circuit that supplies driving power to the motor body; and
a control circuit including a PWM controller, the control circuit being configured to adjust the driving power by PWM control and control an operation mode of the opening-closing body through the motor body such that the operation mode is changeable, wherein
the PWM controller is configured to have a control frequency of the PWM control include a frequency in an audible range based on a predetermined trigger so that the motor body vibrates in the audible range, thereby performing a sound producing operation,
the predetermined trigger includes information about an opening-closing state of the opening-closing body or information about activation and deactivation of a child lock,
the information about the opening-closing state of the opening-closing body is information about a low-speed operation of the opening-closing body, and
the PWM controller is configured to perform a sound producing operation by having the control frequency of the PWM control include a frequency in the audible range so that the motor body vibrates in the audible range in a section where a switching element of the drive circuit is turned on and off to operate the opening-closing body at a low speed rather than being kept on to operate the opening-closing body at a normal speed.

9. The opening-closing body driving motor according to claim 8, wherein a section where the sound producing operation is performed together with the low-speed operation of the opening-closing body is a section at a fully closed side of the opening-closing body that is closed.

10. The opening-closing body driving motor according to claim 8, wherein the PWM controller repeats switching between the audible range and the inaudible range of the control frequency of the PWM control at least twice or more in the section where the sound producing operation is performed.

11. The opening-closing body driving motor according to claim 8, wherein
the control circuit requires to temporarily set the opening-closing body at a fully open position and then close the opening-closing body to a fully closed position in an initial setting of position detection of the opening-closing body, and
the PWM controller locally switches the control frequency of the PWM control to the audible range at the fully open position and the fully closed position so that the fully open position and the fully closed position of the opening-closing body are each recognizable.

12. The opening-closing body driving motor according to claim 8, wherein the opening-closing body, which is a subject that is opened and closed by the motor body, is a window glass provided in a vehicle door.

13. The opening-closing body driving motor according to claim 8, wherein the motor body is a brushed motor.

14. The opening-closing body driving motor according to claim 8, wherein the motor body is a brushless motor.

15. An opening-closing body driving motor comprising:
a motor body for automatically opening and closing an opening-closing body of a vehicle;
a drive circuit that supplies driving power to the motor body; and
a control circuit including a PWM controller, the control circuit being configured to adjust the driving power by PWM control and control an operation mode of the opening-closing body through the motor body such that the operation mode is changeable, wherein
the PWM controller is configured to have a control frequency of the PWM control include a frequency in an audible range based on a predetermined trigger so that the motor body vibrates in the audible range, thereby performing a sound producing operation,
the predetermined trigger includes information about an opening-closing state of the opening-closing body or information about activation and deactivation of a child lock, the PWM controller is configured to perform a sound producing operation by having the control frequency of the PWM control include a frequency in the audible range so that the motor body vibrates in the audible range in a case in which the opening-closing body is operated through the motor body when a child lock is activated, and the child lock permits an opening operation from an outdoor side of a vehicle door and prohibits an opening operation from an indoor side.

16. The opening-closing body driving motor according to claim 15, wherein the PWM controller is configured to repeat switching between the audible range and the inaudible range of the control frequency of the PWM control at least twice or more when the sound producing operation is performed.

17. The opening-closing body driving motor according to claim 15, wherein the opening-closing body, which is a subject that is opened and closed by the motor body, is a window glass provided in a vehicle door.

18. An opening-closing body driving system comprising:
an opening-closing body driving motor including a motor body for automatically opening and closing an opening-closing body of a vehicle;
a drive circuit that supplies driving power to the motor body; and
a control circuit including a PWM controller, the control circuit being configured to adjust the driving power by PWM control and control an operation mode of the opening-closing body through the motor body such that the operation mode is changeable, wherein
the PWM controller is configured to have a control frequency of the PWM control include a frequency in an audible range based on a predetermined trigger so that the motor body vibrates in the audible range, thereby performing a sound producing operation,
the predetermined trigger includes information about an opening-closing state of the opening-closing body or information about activation and deactivation of a child lock,
the control circuit is configured to shift from a normal mode to a sound production mode in response to a sound production request based on vehicle states including the opening-closing state of the opening-closing body and a getting-out state of the vehicle, and
the PWM controller is configured to switch a motor applied voltage according to adjustment of the PWM control to a minute voltage such that the motor body minutely vibrates within an inoperative range of the opening-closing body based on the shift to the sound production mode, and perform a sound producing operation by changing the control frequency of the PWM control from an inaudible range to the audible range and minutely vibrating the motor body in the audible range.

19. An opening-closing body driving system comprising:
an opening-closing body driving motor including a motor body for automatically opening and closing an opening-closing body of a vehicle;
a drive circuit that supplies driving power to the motor body; and
a control circuit including a PWM controller, the control circuit being configured to adjust the driving power by PWM control and control an operation mode of the opening-closing body through the motor body such that the operation mode is changeable, wherein the PWM controller is configured to have a control frequency of the PWM control include a frequency in an audible range based on a predetermined trigger so that the motor body vibrates in the audible range, thereby performing a sound producing operation,
the predetermined trigger includes information about an opening-closing state of the opening-closing body or information about activation and deactivation of a child lock,
the information about the opening-closing state of the opening-closing body is information about a low-speed operation of the opening-closing body, and
the PWM controller is configured to perform a sound producing operation by having the control frequency of the PWM control include a frequency in the audible range so that the motor body vibrates in the audible range in a section where a switching element of the drive circuit is turned on and off to operate the opening-closing body at a low speed rather than being kept on to operate the opening-closing body at a normal speed.

20. An opening-closing body driving system comprising:
an opening-closing body driving motor including a motor body for automatically opening and closing an opening-closing body of a vehicle;
a drive circuit that supplies driving power to the motor body; and
a control circuit including a PWM controller, the control circuit being configured to adjust the driving power by PWM control and control an operation mode of the opening-closing body through the motor body such that the operation mode is changeable, wherein
the PWM controller is configured to have a control frequency of the PWM control include a frequency in an audible range based on a predetermined trigger so that the motor body vibrates in the audible range, thereby performing a sound producing operation,
the predetermined trigger includes information about an opening-closing state of the opening-closing body or information about activation and deactivation of a child lock,
the opening-closing body is one of window glasses of right and left rear seat doors of the vehicle,
the opening-closing body driving motor is one of opening-closing body driving motors respectively provided for the window glasses of the right and left rear seat doors,
each of the opening-closing body driving motors includes
a motor body for automatically opening and closing the window glass of the rear seat door provided therein,
a drive circuit that supplies driving power to the motor body, and
a control circuit including a PWM controller, the control circuit being configured to adjust the driving power by PWM control and control an operation mode of the window glass through the motor body such that the operation mode is changeable,
the PWM controller is configured to perform a sound producing operation by having the control frequency of the PWM control include a frequency in the audible range so that the motor body vibrates in the audible range in a case in which the window glass is operated through the motor body when a child lock is activated, and
the child lock permits an opening operation from an outdoor side of the rear seat door and prohibits an opening operation from an indoor side.

21. The opening-closing body driving system according to claim 20, wherein the PWM controller is configured to perform the sound producing operation of the motor body in a case in which the window glass is operated through the motor body when the child lock of at least one of the rear seat doors is activated.

22. The opening-closing body driving system according to claim 20, wherein the PWM controller of the control circuit in each of the opening-closing body driving motors is configured to perform the sound producing operation of the motor body in a case in which the window glass is operated through the motor body when the child lock of the rear seat door provided therein is activated.

* * * * *